United States Patent
Braun

(10) Patent No.: US 7,622,544 B2
(45) Date of Patent: Nov. 24, 2009

(54) PROCESS FOR PREPARATION OF BIODEGRADABLE POLYMERS AND RESINS FROM PROTEINS, AND PLASTICS OBTAINED THEREBY

(75) Inventor: Sergei Braun, Zur Hadassa (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 400 days.

(21) Appl. No.: 10/536,467

(22) PCT Filed: Nov. 27, 2003

(86) PCT No.: PCT/IL03/01010

§ 371 (c)(1),
(2), (4) Date: May 25, 2005

(87) PCT Pub. No.: WO2004/050732

PCT Pub. Date: Jun. 17, 2004

(65) Prior Publication Data

US 2006/0079663 A1      Apr. 13, 2006

Related U.S. Application Data

(60) Provisional application No. 60/429,550, filed on Nov. 29, 2002.

(51) Int. Cl.
*C08G 63/44*   (2006.01)
*C08G 63/02*   (2006.01)

(52) U.S. Cl. ............ 528/272; 528/288; 528/318; 528/328; 524/606; 523/118

(58) Field of Classification Search ............ None
See application file for complete search history.

(56) References Cited

U.S. PATENT DOCUMENTS

| RE30,170 E | * | 12/1979 | Goodman |
| 5,397,834 A | | 3/1995 | Jane et al. |
| 5,523,293 A | | 6/1996 | Jane et al. |
| 5,710,190 A | | 1/1998 | Jane et al. |

FOREIGN PATENT DOCUMENTS

EP      0063879      11/1982

OTHER PUBLICATIONS

Ara et al. "Effect of Blending Calcium Compounds on Hydrolytic Degradation of Poly(DL-Lactic Acid-Co-Glycolic Acid)", Biomaterials, 23: 2479-2483, 2002.
Gouesnard "Réactivité du Nitrite de Sodium. V. Action sur les Amino-Acides, Peptides et Protéines", Bulletin de la Société Chimique de France, 1: 88-94, 1989.
Kertes et al. "Extraction Chemistry of Fermentation Product Carboxylic Acids", Biotechnology and Bioengineering, XXVIII: 269-282, 1986.
King "Amine-Based Systems for Carboxylic Acid Recovery—Tertiary Amines and the Proper Choice of Dilient Allow Extraction and Recovery from Water", Chemtech, May: 285-291, 1992.
Malmary et al. "Recovery of aconitic and lactic acids from simulated aqueous effluents of the sugar-cane industry through liquid-liquid extraction", Journal of Chemical Technology and Biotechnology, 75: 1169-1173, 2000.
Schmidt "The Reaction Between Nitrous Acid and Certain Amino Acids and Related Compounds At 45'.", The Journal of Biological Chemistry, LXXXII(3): 587-594,1929.
Van Slyke "A Method for Quantitative Determination Of Aliphatic Amino Groups— Applications To The Study Of Proteolysis and Proteolytic Products". Laboratories of the Rockefeller Institutefor Medical Research, p. 185-204, 1911.
Walden "Weiteres über Optisch Active Halogenverbindungen", Chemische Berichte, 28: 2767-2773, 1923.
International Preliminary Examination Report Dated May 5, 2006 From the International Preliminary Examining Authority Re.: Application No. PCT/IL03/01010.
Official Action Dated Feb. 21, 2008 From the US Patent Office Re.: U.S. Appl. No. 10/536,467.
Supplementary European Search Report Dated Dec. 28, 2006 From the European Patent Office Re.: Application No. 03773985.1.
Communication Pursuant to Article 94(3) EPC Dated Apr. 2, 2009 From the European Patent Office Re.: Application 03773985.1.
Groeger et al. "BPTI Backbone Variants and Implications for Inhibitory Activity", International Journal of Peptide & Protein Research, XP0004565590, 44(2): 166-172, Aug. 1994.
Shukla et al. "Zein: The Industrial Protein From Corn", Industrial Crops and Products, An International Journal, 13: 171-192, 2001.
Solina et al. "Volatile Aroma Components of Soy Protein Isolate and Acid-Hydrolysed Vegetable Protein", Food Chemistry, 90: 861-873, 2005.

* cited by examiner

*Primary Examiner*—Vasu Jagannathan
*Assistant Examiner*—Gennadiy Mesh

(57) ABSTRACT

A method for preparing polyester/polyamide polymers, resins and plastics from proteins is disclosed. Using nitrous acid or nitrous oxide, a protein is converted to a hydroxyl carboxyl polyamide protomer. Protomers are condensed through hydroxyl and carboxyl groups to make inter-protomer ester bonds, resulting in a polyester polyamide polymer, resin or plastic.

29 Claims, No Drawings

PROCESS FOR PREPARATION OF BIODEGRADABLE POLYMERS AND RESINS FROM PROTEINS, AND PLASTICS OBTAINED THEREBY

RELATED PATENT APPLICATION

This application is a National Phase Application of PCT/IL03/01010 having International Filing Date of 27 Nov. 2003, which claims the of benefit of U.S. Provisional Patent Application No. 60/429,550 filed 29 Nov. 2002.

FIELD AND BACKGROUND OF THE INVENTION

The present invention relates to the field of plastics and more particularly, to a general method for the preparation of plastic objects, plastics, polyester/polyamide resins and polymers from amino acids, dipeptides, tripeptides, polypeptides, proteins and/or other proteinaceous material. The products obtained by the process of the Due to environmental considerations, the disposal of solid waste is a major industrial concern. One of the most difficult to dispose types of waste is non-biodegradable plastics used, for example, in agricultural applications and packaging. Concerns over the effect of non-biodegradable plastics have resulted in a worldwide prohibition of plastic disposal at sea, increasingly severe regulatory limits on use of non-biodegradable plastics and incentives to reduce the amounts of non-biodegradable plastics used. These trends have resulted in an increased demand for biodegradable plastics, especially in the fields where recycling is difficult such as packaging materials and agricultural plastics (e.g. mulch films).

The biodegradable plastics known in the art have been accepted only sparingly, primarily due to the high cost of the final product, the high cost primarily being determined by the high cost of sufficiently pure raw materials.

A further disadvantage of biodegradable plastics known in the art is the rather limited range of properties that are available. Obviously, different implementations require plastics with different physical properties such as barrier properties, glass transition temperature, viscosity, stickiness, pliability, transparence/opaqueness, malleability, tear-resistance and the like.

Currently available commercially important biodegradable plastics fall into three main categories: polylactides, starch-based polymers and polyhydroxyalkanoates.

Polylactide polymers (PLA) are produced by polymerization of lactic acid. Lactic acid is first oligomerized with the loss of water to yield linear chains of polylactic acid. The polylactic acid is de-polymerized to yield lactide, a cyclic dimer The six-member ring of the lactide is purified and subjected to ring-opening polymerization to produce PLA resin. Cargill Dow Polymers LLC (Minneapolis, Minn., USA) is the largest producer of PLA resins. PLAs can be processed by most melt fabrication techniques including thermoforming, sheet and film extrusion, blown film processing, fiber spinning and injection molding. Applications include coatings for paper plates. A disadvantage of PLA plastics is that the linearity of the molecules limits the range of physical properties that such plastics can have. This is most critical as such polymers generally have a relatively high glass transition temperature, $T_g$. Further, as the polymers are linear, every hydroxy or carboxylic impurity present during polymerization results in chain termination leading to low molecular weight products with poor chemical and mechanical stability. Related to PLA is PGA, a polyester plastic derived from polyglycolic acid.

The main starch-based plastics are starch/ethylene-vinyl alcohol copolymer blends. These blends are prepared by blending a starch-based component and an ethylene-vinyl copolymer in an extruder in the presence of water or other plasticizer. The temperature and pressure conditions destructurize the starch and the resulting extruded composition forms a thermoplastic melt. Such plastics have physical properties similar to polystyrene or polyethylene but are moisture-sensitive. Novamont SpA (Novara, Italy) produces such resins containing 60% starch that are marketed under the name Mater-Bi® and can be shaped by film blowing, extrusion, injection molding or thermoforming. Novon International (Tonawanda, N.Y., USA) produces a resin containing up to 95% starch and marketed under the name Novon®. It is important to note that such materials are not truly biodegradable as the non-starch component of the plastic remains as minute particles.

Polyhydroxyalkanoates (PHA) plastics are linear polyesters produced by bacterial fermentation of sugar or lipids. The production of PHA plastics is described in Doi. Y. *Microbial Polyesters*, VCH Publishers, New York, N.Y., 1990. More than 100 different monomers can be combined within this family to give materials with a wide-range of properties. PHAs can be either thermoplastic or elastomeric materials, with melting-points ranging from 40° to 180° C. and are suitable for blow molding, injection molding and extrusion. The leading producer of PHAs is the Monsanto Company (St. Louis, Mo., USA) manufacturing a polyhydroxybutyrate under the name Biopol®. PHAs are entirely biodegradable but very expensive.

In the art, proteins have been used as a primary component in the production of plastics. Pure protein plastics are generally fragile and absorb moisture. To improve the mechanical and barrier properties of protein-based plastics, the protein component is generally modified to increase hydrophobicity.

In 1899, Adolf Spitteler received a German patent (Encyclopedia of Polymer Science and Technology, Interscience Publishing, NY, 1965, vol. II, p. 695.) for casein formaldehyde first sold under the name Galalith. Casein formaldehyde is a thermoset plastic made by steeping solid casein workpieces in formaldehyde. Casein formaldehyde is still used in the manufacture of buttons.

Ghorpade et al. (Ghorpade, V. M.; Lin, H.; Hanna, M. A. "Physical and mechanical properties of protein-polyethylene extrudate" ASAE Paper No. 93-6533, 1993) teach the use of chemicals such as formaldehyde and dimethoxy dimethyl silane to increase the hydrophobicity of the protein used as a coextrudate with polyethylene to make a composite plastic.

U.S. Pat. Nos. 5,397,834, 5,523,293 and 5,710,190 teach the combination of pure soy protein, a foaming agent, a plasticizer and water to make a biodegradable thermoplastic material. Such plastics comprise soy protein cross linked with an aldehyde starch. The high cost of sufficiently pure soy protein makes such plastics uncompetitive with prior art polyethylene.

There is a widely recognized need for, and it would be highly advantageous to have a general method for producing plastics from inexpensive raw materials. There is also a widely recognized need for, and it would be highly advantageous to have a general method for producing biodegradable plastics. There is also a widely recognized need for and it would be highly advantageous to have a general method for producing biodegradable plastics having many and varied physical properties.

SUMMARY OF THE INVENTION

The present invention successfully addresses the shortcomings of the prior art by providing a new polymer, a new resin, a new plastic, a new plastic object and a new process of making the same.

The present invention provides a general process of producing polymers, resins or plastics from any protein-containing substrate. In some, but not all, embodiments the raw material is relatively cheap and easy to acquire. In some, but not all, embodiments, the final plastic product is biodegradable. As is discussed hereinbelow, the exact identity of the protein-containing substrate determines the physical properties of the plastic product ultimately made. Since the variety of protein-containing substrate is effectively infinite, the range of physical properties of plastics made according to the teachings of the present invention is effectively unlimited. Thus the teachings of the present invention are general in the sense of being applicable to virtually any protein-containing substrate and general in the sense that plastics having virtually any physical property desired from a plastic can be made using the teachings of the present.

The present invention is of a method of making a resin from a protein-containing substrate, the resin being useful in the manufacture of plastics. The resin substantially comprises a plurality of protomers mutually bound with polyester and polyamide bonds. In some embodiments the binding is through or with copolymers. The protomers substantially comprise proteinaceous substances where primary amines are replaced by hydroxyl groups and/or free amide groups are replaced with carboxyl groups, for example, as modified by the action of nitrous acid or nitrous oxide.

The present invention is also of a plastic product, a plastic and a resin made of a polymer made according to the method of the present invention.

According to the teachings of the present invention there is provided a process of producing a polymer comprising (a) providing hydroxyl-carboxyl protomers; and (b) condensing the hydroxyl-carboxyl protomers to form the polymer.

It is important to note that the term protomer as used herein does not necessarily refer to a single compound having a unique chemical formula. Rather, as is detailed hereinbelow, the term protomer more generally refers to a mixture of individual molecules, the mixture being a product of the method of the present invention. This mixture is condensed to form the polymer of the present invention.

According to a feature of the present invention the protomers of the present invention have a structure of:

wherein:

Y is a proteinaceous material, OH or $NH_2$; and $R_a$ is selected from the group consisting of $—(CH_2)_3—NH—C(NH_2)(=NH)$ (arginine side group), $—(CH_2)_3—NH—C(OH)(=NH)$ (arginine side group where $—NH_2$ is replaced by $—OH$), $—(CH_2)_4NH_2$ (lysine side group), $—(CH_2)_4OH$ (lysine side group where $—NH_2$ is replaced by $—OH$), $—CH_2OH$ (serine side group), $—CHOHCH_3$ (threonine side group), $—CH_2—C_6H_4p-OH$ (tyrosine side group), $—CH_2CONH_2$ (aspargine side group), $—CH_2COOH$ (aspartic acid side group), $—(CH_2)_2CONH_2$ (glutamine side group), $—(CH_2)_2COOH$ (glutamic acid side group), $—CH_2SH$ (cysteine side group), $—H$ (glycine side group), $—CH_3$ (alanine side group), $—CH_2c(C=CH—N=CH—NH—)$ (histidine side group), $—CH(CH_3)CH_2CH_3$ (isoleucine side group), $—CH_2CH(CH_3)_2$ (leucine side group), $—(CH_2)_2SCH_3$ (methionine side group, $—CH_2C_6H_5$ (phenylalanine side group, $—CH_2-c(C=CH—NH-Ph)$-(tryptophan side group), and $—CH(CH_3)_2$ (valine side group).

It is clear to one skilled in the art that this definition also includes prior art amino-acids, dipeptides, tripeptides, polypeptides and proteins.

Conceptually, the innovative protomers of the present invention are proteinaceous materials where some or all of the primary amines have been converted to hydroxyl groups. The protomers of the present invention can be roughly divided into two groups: (I) proteinaceous materials where an N-terminal amine is replaced with a hydroxyl group and (II) proteinaceous materials where an amino group of a side chain of an amino acid residue is replaced with a hydroxyl group.

According to a feature of the present invention, a more rigorous definition of the structure of group I protomers of the present invention is:

wherein:

Y is OH; and $R_a$ is selected from the group consisting of $—(CH_2)_3—NH—C(NH_2)(=NH)$ (arginine side group), $—(CH_2)_3—NH—C(OH)(=NH)$ (arginine side group where $—NH_2$ is replaced by $—OH$), $—(CH_2)_4NH_2$ (lysine side group), $—(CH_2)_4OH$ (lysine side group where $—NH_2$ is replaced by $—OH$), $—CH_2OH$ (serine side group), $—CHOHCH_3$ (threonine side group), $—CH_2—C_6H_4p-OH$ (tyrosine side group), $—CH_2CONH_2$ (aspargine side group), $—CH_2COOH$ (aspartic acid side group), $—(CH_2)_2CONH_2$ (glutamine side group), $—(CH_2)_2COOH$ (glutamic acid side group), $—CH_2SH$ (cysteine side group), $—H$ (glycine side group), $—CH_3$ (alanine side group), $—CH_2c(C=CH—N=CH—NH—)$ (histidine side group), $—CH(CH_3)CH_2CH_3$ (isoleucine side group), $—CH_2CH(CH_3)_2$ (leucine side group), $—(CH_2)_2SCH_3$ (methionine side group, $—CH_2C_6H_5$ (phenylalanine side group, $—CH_2-c(C=CH—NH-Ph)$-(tryptophan side group), and $—CH(CH_3)_2$ (valine side group).

According to a feature of the present invention, a more rigorous definition of the structure of group II protomers of the present invention is:

wherein:

Y is a proteinaceous material, OH or $NH_2$; and $R_a$ is selected from the group consisting of $—(CH_2)_3—NH—C(OH)(=NH)$ (arginine side group where $—NH_2$ is replaced by $—OH$) and $—(CH_2)_4OH$ (lysine side group where $—NH_2$ is replaced by $—OH$).

According to a feature of the present invention, at least one of the hydroxyl-carboxyl protomers has a structure

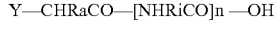

wherein:

n is a positive integer;

i is an integer from 1 to n;

Y is a proteinaceous material, OH or $NH_2$; and $R_a$ and each one of $R_i$ is independently selected from the group consisting of $—(CH_2)_3—NH—C(NH_2)(=NH)$ (arginine side group), $—(CH_2)_3—NH—C(OH)(=NH)$ (arginine side group where $—NH_2$ is replaced by $—OH$), $—(CH_2)_4NH_2$ (lysine side group), $—(CH_2)_4OH$ (lysine side group where $—NH_2$ is replaced by $—OH$), $—CH_2OH$ (serine side group), $—CHOHCH_3$ (threonine side group), —$CH_2$—$C_6H_4$p-OH (tyrosine side group), —$CH_2CONH_2$ (aspargine side group), —$CH_2COOH$ (aspartic acid side group), —$(CH_2)_2CONH_2$ (glutamine side group), —$(CH_2)_2COOH$ (glutamic acid side group), —$CH_2SH$ (cysteine side group), —H (glycine side group), —$CH_3$ (alanine side group), —$CH_2c(C=CH—N=CH—NH—)$ (histidine side group), —$CH(CH_3)CH_2CH_3$ (isoleucine side group), —$CH_2CH(CH_3)_2$ (leucine side group), —$(CH_2)_2SCH_3$ (methionine side group, —$CH_2C_6H_5$ (phenylalanine side group, —$CH_2$-c(C=CH—NH-Ph)-(tryptophan side group), and —$CH(CH_3)_2$ (valine side group);

where at least either Y is OH and/or at least one Ri or Ra is selected from the group consisting of —$(CH_2)_3$—NH—C(OH)(=NH) (arginine side group where —$NH_2$ is replaced by —OH) and —$(CH_2)_4OH$ (lysine side group where —$NH_2$ is replaced by —OH).

According to a feature of the present invention, providing the hydroxyl-carboxyl protomers comprises (i) providing a protein-containing substrate; and either or both (ii) replacing primary amines of proteinaceous components of the protein-containing substrate with hydroxyl groups; and/or (iii) replacing amide groups of proteinaceous components of the protein-containing substrate with carboxyl groups; so as to make the protomers from the proteinaceous components.

According to a feature of the present invention, providing the hydroxyl-carboxyl protomers comprises (i) providing a protein-containing substrate; and (ii) replacing primary amines of proteinaceous components of the protein-containing substrate with hydroxyl groups; so as to make the protomers from the proteinaceous components.

According to a feature of the present invention providing the hydroxyl-carboxyl protomers comprises (i) providing a protein-containing substrate; and (ii) replacing amide groups of proteinaceous components of the protein-containing substrate with carboxyl groups; so as to make the protomers from the proteinaceous components.

According to a feature of the present invention, the protein-containing substrate is selected from the group consisting of plant products, grain-products, pulse-products, leaves, animal products, dairy products, milk, cheese, eggs, egg whites, abattoir waste, blood, fishery waste, meat products and microbial sludge.

According to a feature of the present invention, prior to the replacing of the amines and/or amides, proteinaceous compounds in the protein-containing substrate are hydrolyzed. According to a feature of the present invention, hydrolysis is enzymatic hydrolysis. According to a different feature of the present invention, hydrolysis is chemical hydrolysis.

According to a feature of the present invention, the replacing of the amines and/or amides comprises reacting the proteinaceous compounds with nitrous acid or nitrous oxides, preferably in an aqueous reaction solution.

According to a feature of the present invention, subsequent to the replacing of the amines and/or amides the concentration of protomers in the aqueous reaction solution is increased. Concentration of protomers is generally performed by the removal of water, for example by evaporation of water, sublimation of water or use of osmosis/filtering techniques, freeze-drying and spray drying.

According to a feature of the present invention, subsequent the replacing of the amines and/or amides, the protomers are extracted from the aqueous reaction solution. According to a feature of the present invention, the extraction is performed by removing water from the aqueous reaction solution, for example by evaporating the water, sublimating the water, freeze-drying the reaction solution, spray drying the reaction solution, filtering the reaction solution, and osmosis. Alternatively, the extraction is performed by extraction of the protomers from the solution for example by a method selected from liquid-liquid extraction using tertiary amines, liquid-liquid extraction using organo-phosphate compounds and solid-phase extraction.

Once protomers have been provided the protomers are condensed to make polymers, resins, plastics and plastic products.

According to a feature of the present invention, the condensing of the hydroxyl-carboxyl protomers to form the polymer is reaction of a hydroxyl group of a first protomer with a carboxyl group of a second protomer so as to form an inter-protomer ester bond.

According to a feature of the present invention, the condensing of the protomers comprises a step of producing inter-protomer ester and amide bonds, preferably in the presence of a catalyst. Generally it is preferred that condensation be performed at a temperature lower than 180° C. to avoid thermal decomposition of the protomers. Since even at 150° C. some thermal decomposition occurs, it is more preferable to condense the protomers at a temperature lower than 150° C.

Suitable catalysts are transamidation, transesterification, amidation or esterification catalysts. One skilled in the art knows of many such catalysts. Further, it is expected that new and suitable catalysts will be developed in the future.

Although an exhaustive list of suitable catalysts cannot be given, such catalysts include but are not limited to titanium compounds especially Ti(IV), tin compounds especially Sn(IV), antimony compounds especially Sb(III), magnesium compounds especially Mg(II), lead compounds especially Pb(III), zinc compounds especially Zn(II), zirconium compounds especially Zr(IV) as well as zeolites such as NaX faujasite zeolites and ETS-10 zeolites Specific examples of suitable catalysts includes: tetraorganodistannoxanes, 1,1,3,3-tetrabutyldichlorodistannoxane, $Bu_2SnO$, bis-(2-ethylhexanoate)-tin, $TiO_2$, $Mg(OEt)_2$, $Sb_2O_3$, Tyzor® TPT (tetra-isopropyl titanate, CAS # 546-68-9), Tyzor® AA (titanium acetylacetonate (bis(pentane-2,4-dionato-O,O') bis(alkanolato) titanium) and Tyzor® NBZ (zirconium tetra-n-butanolate, CAS # 107-76-7).

Suitable catalysts can be obtained from, amongst others, Johnson Matthey Plc (London, United Kingdom) and E.I. du Pont de Nemours and Company (Wilmington, Del., USA)

It is important to note that most, if not all, transesterification and esterification catalysts are also transamidation and amidation catalysts. Thus, an aspect of the present invention is that in addition to the formation of ester bonds, amide bonds are also formed by the condensing of amine groups with acid groups. Generally, but not necessarily amide bonds are formed at higher temperatures than ester bonds, so when a polymer, resin or plastic is planned according to the teachings of the present invention, the temperature of reaction can be used to direct the proportion of amide and ester bonds performed and so to determine the nature of the polymer, resin and plastic formed.

In addition to pure polymers, resins and plastics made exclusively with protomers of the present invention, according to a feature of the present invention are provided polymers, resins and plastics that include copolymers. Suitable copolymers form bonds with the protomers of the present invention through esterification, transesterification, transamidation or amidation reactions, generally in the presence of a suitable catalyst.

Thus according to the teachings of the present invention is also provided a process of producing a polymer comprising (a) providing hydroxyl-carboxyl protomers; (b) providing at least one copolymer; (c) combining the hydroxyl-carboxyl protomers with the at least one copolymer to make a precursor mix; and (d) condensing molecules in said precursor mix to form the polymer.

According to a feature of the present invention condensing is the reaction of a hydroxyl group of a first protomer with a carboxyl group of a second protomer so as to form an inter-protomer ester bond.

According to a feature of the present invention condensing is the bond-forming reaction of a first functional group (of a first protomer) with a second functional group (of a copolymer molecule). In a first embodiment, one functional group is an amine and the other a carboxyl functional group, and the bond formed is an amide bond. In a different embodiment, one functional group is a hydroxyl and the other a carboxyl functional group, and the bond formed is an ester bond.

According to a feature of the present invention condensing is the bond-forming reaction of a first functional group (of a first protomer) with a second functional group (of a copolymer molecule) and a bond-forming reaction of a third functional group (of a second protomer) with a fourth functional group (of the same copolymer molecule). In a first embodiment, one functional group of a bond forming pair is an amine and the other a carboxyl functional group, and the bond formed is an amide bond. In a different embodiment, one functional group of a bond forming pair is a hydroxyl and the other a carboxyl functional group, and the bond formed is an ester bond. In such a way a copolymer molecule acts as a bridge between two protomers.

Copolymers have at least one functional group with which to condense with protomers of the present invention. Suitable functional groups include but are not limited to carboxyls, hydroxyls, amides, cyclic amides, esters, and cyclic esters. Generally suitable copolymers include but are not limited to carboxylic acids, poly carboxylic acids, alcohols, alcohol acids, amino acids, polyalcohols, amides, cyclic amides, polyamides, esters, cyclic esters, polyesters and polyurethanes.

In order to avoid capping of polymerization sites and consequent chain termination multifunctional copolymers are preferred over monofunctional copolymers. Such multifunctional copolymers include but are not limited to polyamines, polyamides, polyesters, polyurethanes, polycarboxylic acids, polyalcohols as well as mixed functional group molecules such as amino acids, amino alcohols, alcohol acids and the like.

Suitable copolymers include, but are not limited to ε-caprolactame, lactic acid, aconitic acid, malic acid, glycolic acid, alkyl amino acids such as aminovaleric acid, aminocaproic acid, and alkyl diamino compounds such as putrescine and cadaverine.

According to the teachings of the present invention there is provided a polymer, a resin, a plastic or a plastic product made according to any one of the processes described herein. One skilled in the art is able, upon study of the disclosure herein, to condense the protomers of the present invention to yield polymers, resins, plastics and plastic products of the present invention.

Subsequent to condensation of protomers of the present invention, whether as a single specific molecule or as a mixture of different protomer molecules, and whether including copolymers as described hereinabove or not, interprotomer bonds are formed, the bonds being characteristic of the teachings of the present invention.

Thus, there is provided according to the teachings of the present invention a polymer, a plastic, a resin and/or an article made of the plastic comprising at least one ester bond A-B where A is selected from the group of radicals consisting of:
$(NHX)(COY)CH—(CH_2)_3—NH—C(=NH)O.$ (hydroxylized arginine residue);
$(NHX)(COY)CH—(CH_2)_4O.$ (hydroxylized lysine residue);
$(NHX)(COY)CH—CH_2O.$ (serine reside);
$(NHX)(COY)CH—CHCH_3O.$ (threonine residue);
$(NHX)(COY)CH—CH_2—C_6H_4p-O.$tyrosine residue); and
$Y—CO—CHR_A—O.$ (hydroxylized N-terminal amine of a proteinaceous material)

and B is selected from the group of radicals consisting of:
$(NHW)(COZ)CH—CH_2—C(=O).$(aspartic acid residue);
$(NHW)(COZ)CH—(CH_2)_2—C(=O).$(glutamic acid residue); and
or $WNHCHR_BC(=O).$(C-terminal acid)

wherein $R_A$ and $R_B$ are independently selected from the group consisting of $—(CH_2)_3—NH—C(NH_2)(=NH)$ (arginine side group), $—(CH_2)_3—NH—C(OH)(=NH)$ (arginine side group where $—NH_2$ is replaced by $—OH$), $—(CH_2)_4NH_2$ (lysine side group), $—(CH_2)_4OH$ (lysine side group where $—NH_2$ is replaced by $—OH$), $—CH_2OH$ (serine side group), $—CHOHCH_3$(threonine side group), $—CH_2—C_6H_4p-OH$ (tyrosine side group), $—CH_2CONH_2$ (aspargine side group), $—CH_2COOH$ (aspartic acid side group), $—(CH_2)_2CONH_2$ (glutamine side group), $—(CH_2)_2COOH$ (glutamic acid side group), $—CH_2SH$ (cysteine side group), $—H$ (glycine side group), $—CH_3$ (alanine side group), $—CH_2c(C=CH—N=CH—NH—)$ (histidine side group), $—CH(CH_3)CH_2CH_3$ (isoleucine side group), $—CH_2CH(CH_3)_2$ (leucine side group), $—(CH_2)_2SCH_3$ (methionine side group, $—CH_2C_6H_5$ (phenylalanine side group, $—CH_2-c(C=CH—NH-Ph-)$ (tryptophan side group), and $—CH(CH_3)_2$ (valine side group); and wherein W, X, Y and Z are independently selected from the group consisting of H or a proteinaceous material. It is important to note that for A the (NHX) and the (COY) groups are bound to a central sp3 carbon to which a hydrogen and a respective radical functional group are also bound. Similarly, It is important to note that for A the (NHW) and the (COZ) groups are bound to a central sp3 carbon to which also a hydrogen and a respective radical functional group are also bound.

According to a feature of the present invention, a polymer of the present invention comprises at least two such bonds A-B. According to a further feature of the present invention, a polymer of the present invention comprises at least five such bonds A-B.

According to a feature of the present invention, A is a $(NHX)(COY)CH—(CH_2)_3—NH—C(=NH)O.$radical and B is a $(NHW)(COZ)CH—CH_2—C(=O).$radical.

According to a feature of the present invention, A is a $(NHX)(COY)CH—(CH_2)_4O.$radical and B is a $(NHW)(COZ)CH—CH_2—C(=O).$radical.

According to a feature of the present invention, A is a $(NHX)(COY)CH—CH_2O.$radical and B is a $(NHW)(COZ)CH—CH_2—C(=O).$radical.

According to a feature of the present invention, A is a $(NHX)(COY)CH—CHCH_3O.$radical and B is a $(NHW)(COZ)CH—CH_2—C(=O).$radical.

According to a feature of the present invention, A is a $(NHX)(COY)CH—CH_2—C_6H_4p-O.$radical and B is a $(NHW)(COZ)CH—CH_2—C(=O).$radical.

According to a feature of the present invention, A is a $Y—CO—CHR_A—O.$radical and B is a $(NHW)(COZ)CH—CH_2—C(=O).$radical.

According to a feature of the present invention, A is a (NHX)(COY)CH—(CH$_2$)$_3$—NH—C(=NH)O.radical and B is a (NHW)(COZ)CH—(CH$_2$)$_2$—C(=O).radical.

According to a feature of the present invention, A is a (NHX)(COY)CH—(CH$_2$)$_4$O.radical and B is a (NHW)(COZ)CH—(CH$_2$)$_2$—C(=O).radical.

According to a feature of the present invention, A is a (NHX)(COY)CH—CH$_2$O.radical and B is a (NHW)(COZ)CH—(CH$_2$)$_2$—C(=O).radical.

According to a feature of the present invention, A is a (NHX)(COY)CH—CHCH$_3$O.radical and B is a (NHW)(COZ)CH—(CH$_2$)$_2$—C(=O).radical.

According to a feature of the present invention, A is a (NHX)(COY)CH—CH$_2$—C$_6$H$_4$p-O.radical and B is a (NHW)(COZ)CH—(CH$_2$)$_2$—C(=O).radical.

According to a feature of the present invention, A is a Y—CO—CHR$_A$—O.radical and B is a (NHW)(COZ)CH—(CH$_2$)$_2$—C(=O).radical.

According to a feature of the present invention, A is a (NHX)(COY)CH—(CH$_2$)$_3$—NH—C(=NH)O.radical and B is a WNHCHR$_B$C(=O).radical.

According to a feature of the present invention, A is a (NHX)(COY)CH—(CH$_2$)$_4$O.radical and B is a WNHCHR$_B$C(=O).radical.

According to a feature of the present invention, A is a (NHX)(COY)CH—CH$_2$O.radical and B is a WNHCHR$_B$C(=O).radical.

According to a feature of the present invention, A is a (NHX)(COY)CH—CHCH$_3$O.radical and B is a WNHCHR$_B$C(=O).radical.

According to a feature of the present invention, A is a (NHX)(COY)CH—CH$_2$—C$_6$H$_4$p-O.radical and B is a WNHCHR$_B$C(=O).radical.

According to a feature of the present invention, A is a Y—CO—CHR$_A$—O.radical; and B is a WNHCHR$_B$C(=O).radical.

There are also provided according to the teachings of the present invention polymers characterized by the following eighteen structures.

A polymer of substantially being two protomers bound through a carboxyl C-terminus of a first protomer and a hydroxyl N-terminus of a second protomer.

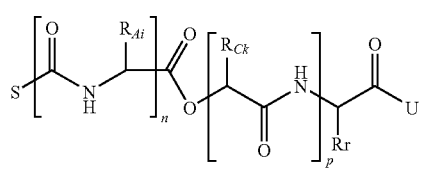

A polymer of substantially being two protomers bound through a glutamic residue side chain of a first protomer and a hydroxyl N-terminus of a second protomer.

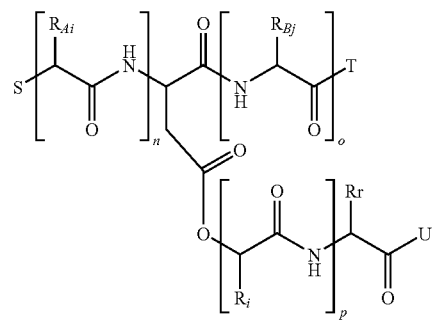

A polymer of substantially being two protomers bound through an aspartic residue side chain of a first protomer and a hydroxyl N-terminus of a second protomer.

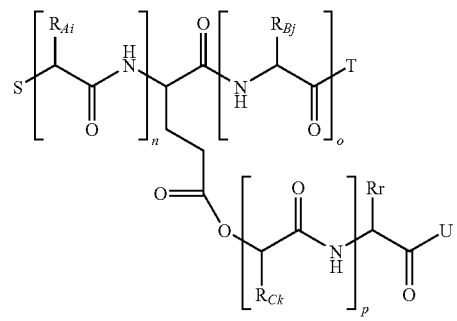

A polymer of substantially being two protomers bound through a carboxyl C-terminus of a first protomer and a tyrosine residue side chain of a second protomer.

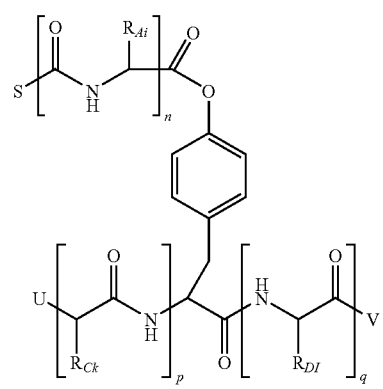

A polymer of substantially being two protomers bound through a glutamic residue side chain of a first protomer and a tyrosine residue side chain of a second protomer.

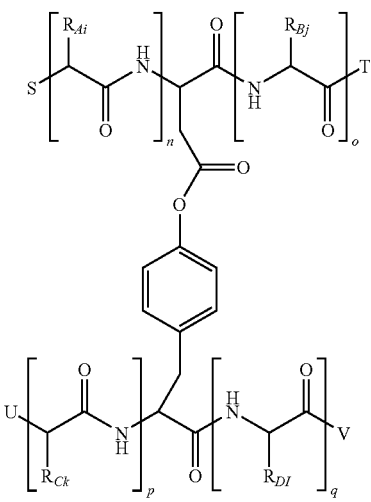

A polymer of substantially being two protomers bound through an aspartic residue side chain of a first protomer and a tyrosine residue side chain of a second protomer.

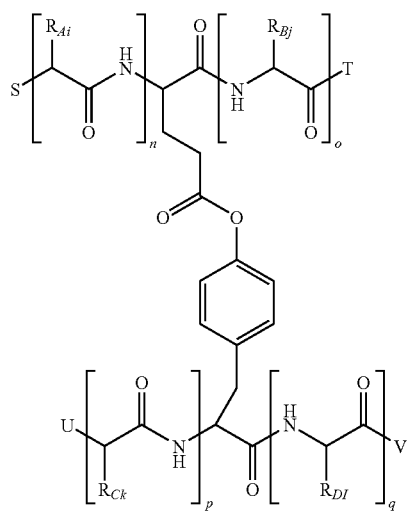

A polymer of substantially being two protomers bound through a carboxyl C-terminus of a first protomer and a tyrosine residue side chain of a second protomer.

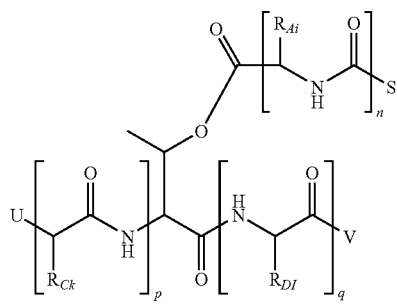

A polymer of substantially being two protomers bound through a carboxyl C-terminus of a first protomer and a threonine residue side chain of a second protomer.

A polymer of substantially being two protomers bound through a glutamic residue side chain of a first protomer and a threonine residue side chain of a second protomer.

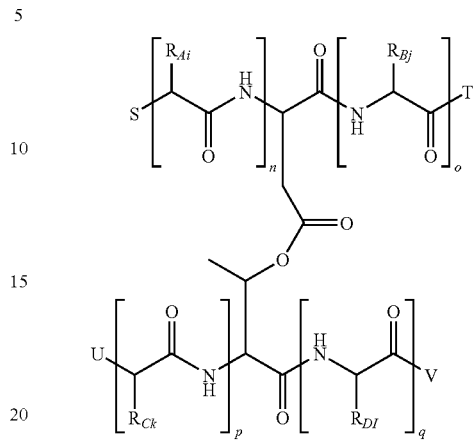

A polymer of substantially being two protomers bound through an aspartic residue side chain of a first protomer and a threonine residue side chain of a second protomer.

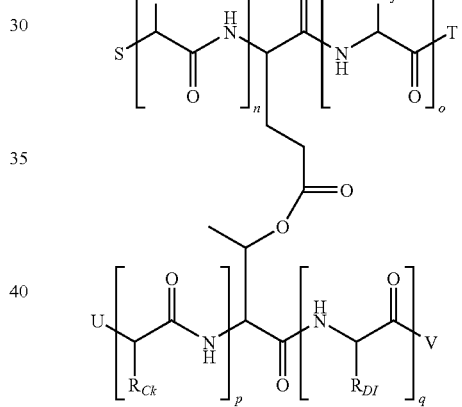

A polymer of substantially being two protomers bound through a carboxyl C-terminus of a first protomer and a serine residue side chain of a second protomer.

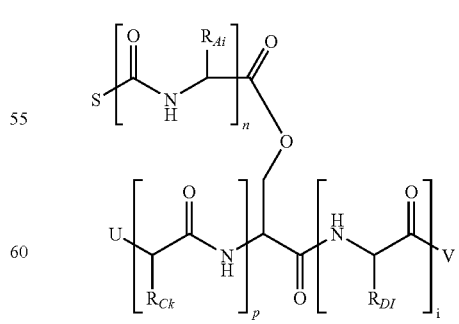

A polymer of substantially being two protomers bound through a glutamic residue side chain of a first protomer and a serine residue side chain of a second protomer.

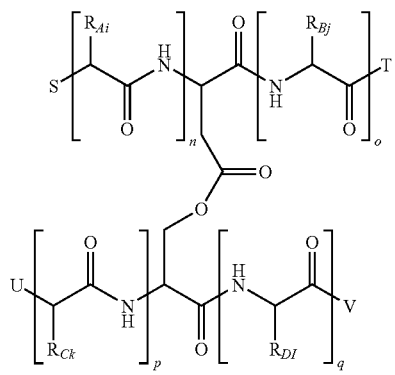

A polymer of substantially being two protomers bound through an aspartic residue side chain of a first protomer and a serine residue side chain of a second protomer.

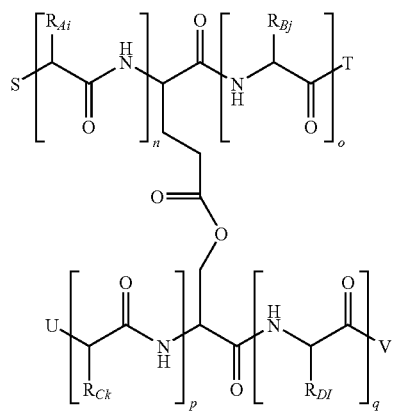

A polymer of substantially being two protomers bound through a carboxyl C-terminus of a first protomer and a lysine residue side chain where the amino group has been converted to a hydroxyl group of a second protomer.

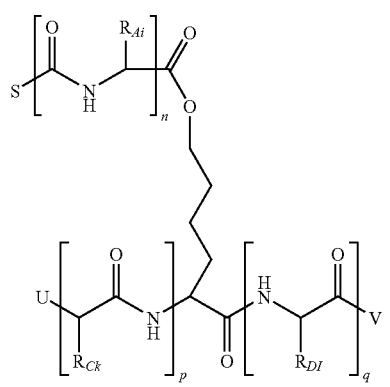

A polymer of substantially being two protomers bound through a glutamic residue side chain of a first protomer and a lysine residue side chain where the amino group has been converted to a hydroxyl group of a second protomer.

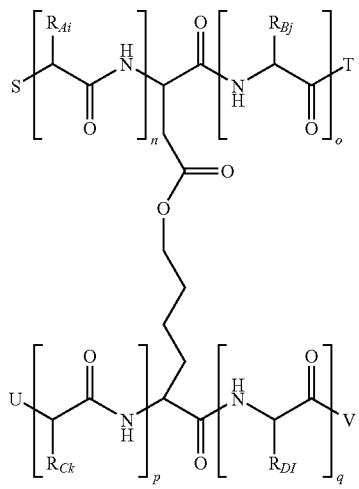

A polymer of substantially being two protomers bound through an aspartic residue side chain of a first protomer and a lysine residue side chain where the amino group has been converted to a hydroxyl group of a second protomer.

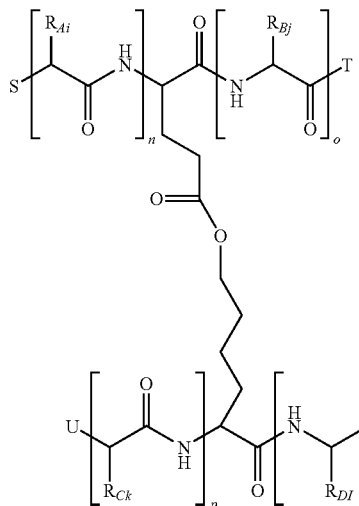

A polymer of substantially being two protomers bound through a carboxyl C-terminus of a first protomer and an arginine residue side chain where an amino group has been converted to a hydroxyl group of a second protomer.

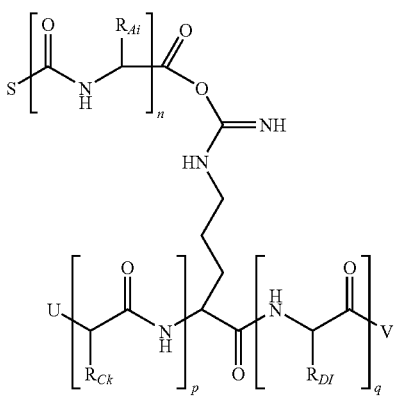

A polymer of substantially being two protomer bound through a glutamic residue side chain of a first protomer and an arginine residue side chain where an amino group has been converted to a hydroxyl group of a second protomer.

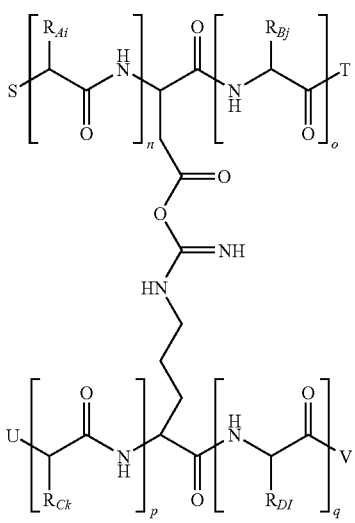

A polymer of substantially being two protomers bound through an aspartic residue side chain of a first protomer and an arginine residue side chain where an amino group has been converted to a hydroxyl group of a second protomer.

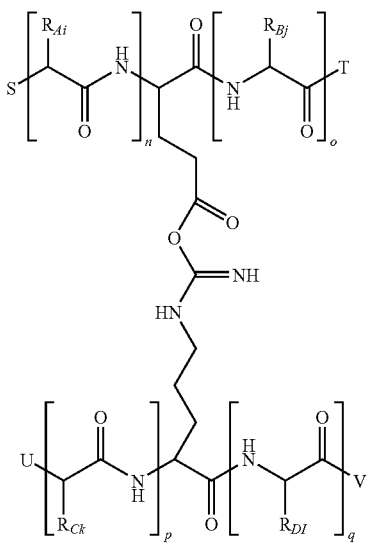

For all of the preceding 18 structures n, o, p and q are 0 or appositive integer, indicating the length of the respective peptide or protein segment. The respective indices i, j, k and l, if existing are used to indicate a specific amino acid residue side chain. Each $R_r$, $R_{Ai}$, $R_{Bj}$, $R_{Ck}$ and $R_{Dl}$ is independently selected from the group consisting of $—(CH_2)_3—NH—C(NH_2)(=NH)$, $—(CH_2)_3—NH—C(OH)(=NH)$, $—(CH_2)_4NH_2$, $—(CH_2)_4OH$, $—CH_2OH$, $—CHOHCH_3$, $—CH_2—C_6H_4p-OH$, $—CH_2CONH_2$, $—CH_2COOH$, $—(CH_2)_2CONH_2$, $—(CH_2)_2COOH$, $—CH_2SH$, $—H$, $—CH_3$, $—CH_2c(C=CH—N=CH—NH—)$, $—CH(CH_3)CH_2CH_3$, $—CH_2CH(CH_3)_2$, $—(CH_2)_2SCH_3$, $—CH_2C_6H_5$, $—CH_2-c(C=CH—NH-Ph-)$, and $—CH(CH_3)_2$ and S, T, U and V are independently selected from the group consisting of OH, H, $NH_2$ or a proteinaceous material.

According to one embodiment of the present invention any of the above listed polymers has an n, o, p and q of at least 1. According to one embodiment of the present invention any of the above listed polymers has an n, o, p and q of at least 2. According to one embodiment of the present invention any of the above listed polymers has an n, o, p and q of at least 3.

DETAILED DESCRIPTION OF THE INVENTION

The present invention is of a polymer, resin or plastic object made from a protein-containing substrate. The present invention is also of a polymer, resin or plastic object made from a protomer, the source of the protomer being a protein-containing substrate. The present invention is also of a process for condensing a protomer to make a polymer, resin or plastic object.

The principles and uses of the teachings of the present invention may be better understood with reference to the accompanying description and examples.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In case of conflict, the patent specification, including definitions, will control. In addition, the materials, methods, and examples are illustrative only and not intended to be limiting.

Hereinfurther, the term dipeptide will be understood to mean two α-amino acid residues joined by an amide bond. The term tripeptide will be understood to mean three α-amino acid residues joined by amide bonds. The term polypeptide is meant to include a polymer of between four and thirty-nine α-amino acid residues joined by amide bonds. The term protein is meant to include a polymer including at least forty α-amino acid residues joined by amide bonds.

Hereinfurther, the term proteinaceous substance will be understood to include one or a mixture of two or more of substances relating to, resembling or being α-amino acids, dipeptides, tripeptides, polypeptides, or proteins and includes but is not limited to non-digested proteins, digested proteins, proteins, branched proteins, protein fragments, polypeptides, branched polypeptides, small peptides and mixtures thereof.

Hereinfurther, the term protein-containing substrate will be understood to include a material containing a proteinaceous substance. Generally such a material should have at least about 1%, preferably at least about 5%, more preferably about 10% and most preferably at least about 20% by weight of a proteinaceous substance. Suitable protein-containing substrates include, but are not limited to: protein-rich plant products such as grains (wheat, rice and corn), pulses (beans and lentils) and leaves (tobacco); protein-rich animal products such as dairy products, eggs, egg whites, abattoir waste, fish waste, meat products and other sources such as microbial sludge.

Implementation of the process of the present invention involves performing or completing selected tasks or steps manually, automatically, or a combination thereof.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

The method of the present invention substantially involves at least two steps (a) providing hydroxyl-carboxyl protomers and (b) generation of inter-protomer bonds (generally ester and/or amide) to form the polymers of the present invention by condensing the hydroxyl-carboxyl protomers to form the polymer. Inter-protomer bonds may be directly between two functional groups of two protomers or may be indirectly, that is with a multifunctional copolymer linking between two protomers.

Protomers of the Present Invention

As stated hereinabove, it is important to note that the term protomer as used herein does not refer to a single molecule, but rather to a heterogeneous mixture of different molecules having various sizes and functions. This is especially true in cases where the protein-containing substrate is hydrolyzed before the protomer preparation reaction is performed.

Generally, protomers of the present invention have a structure of:

where:
Y is a proteinaceous material, OH or $NH_2$; and
$R_a$ is selected from the group consisting of —$(CH_2)_3$—NH—$C(NH_2)(=NH)$ (arginine side group), —$(CH_2)_3$—NH—$C(OH)(=NH)$ (arginine side group where —$NH_2$ is replaced by —OH), —$(CH_2)_4NH_2$ (lysine side group), —$(CH_2)_4OH$ (lysine side group where —$NH_2$ is replaced by —OH), —$CH_2OH$ (serine side group), —$CHOHCH_3$ (threonine side group), —$CH_2$—$C_6H_4$p-OH (tyrosine side group), —$CH_2CONH_2$ (aspargine side group), —$CH_2COOH$ (aspartic acid side group), —$(CH_2)_2CONH_2$ (glutamine side group), —$(CH_2)_2COOH$ (glutamic acid side group), —$CH_2SH$ (cysteine side group), —H (glycine side group), —$CH_3$ (alanine side group), —$CH_2c(C=CH—N=CH—NH—)$ (histidine side group), —$CH(CH_3)CH_2CH_3$ (isoleucine side group), —$CH_2CH(CH_3)_2$ (leucine side group), —$(CH_2)_2SCH_3$ (methionine side group, —$CH_2C_6H_5$ (phenylalanine side group, —$CH_2$-c(C=CH—NH-Ph)-(tryptophan side group), and —$CH(CH_3)_2$ (valine side group).

This definition also includes prior art amino-acids, dipeptides, tripeptides, polypeptides and proteins.

Conceptually, protomers of the present invention are proteinaceous materials where some or all of the primary amines have been converted to hydroxyl groups. The protomers of the present invention can be roughly divided into two groups: (I) proteinaceous materials where an N-terminal amine is replaced with a hydroxyl group and (II) proteinaceous materials where an amino group of a side chain of an amino acid residue is replaced with a hydroxyl group.

A more rigorous definition of the structure of group I protomers is:

wherein:
Y is OH; and
$R_a$ is selected from the group consisting of —$(CH_2)_3$—NH—$C(NH_2)(=NH)$ (arginine side group), —$(CH_2)_3$—NH—$C(OH)(=NH)$ (arginine side group where —$NH_2$ is replaced by —OH), —$(CH_2)_4NH_2$ (lysine side group), —$(CH_2)_4OH$ (lysine side group where —$NH_2$ is replaced by —OH), —$CH_2OH$ (serine side group), —$CHOHCH_3$ (threonine side group), —$CH_2$—$C_6H_4$p-OH (tyrosine side group), —$CH_2CONH_2$ (aspargine side group), —$CH_2COOH$ (aspartic acid side group), —$(CH_2)_2CONH_2$ (glutamine side group), —$(CH_2)_2COOH$ (glutamic acid side group), —$CH_2SH$ (cysteine side group), —H (glycine side group), —$CH_3$ (alanine side group), —$CH_2c(C=CH—N=CH—NH—)$ (histidine side group), —$CH(CH_3)CH_2CH_3$ (isoleucine side group), —$CH_2CH(CH_3)_2$ (leucine side group), —$(CH_2)_2SCH_3$ (methionine side group, —$CH_2C_6H_5$ (phenylalanine side group, —$CH_2$-c(C=CH—NH-Ph)-(tryptophan side group), and —$CH(CH_3)_2$ (valine side group).

A more rigorous definition of the structure of group II protomers is:

wherein:
Y is a proteinaceous material, OH or $NH_2$; and
$R_a$ is selected from the group consisting of —$(CH_2)_3$—NH—$C(OH)(=NH)$ (arginine side group where —$NH_2$ is replaced by —OH) and —$(CH_2)_4OH$ (lysine side group where —$NH_2$ is replaced by —OH).

According to a feature of the present invention, at least one of the hydroxyl-carboxyl protomers has a structure

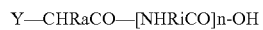

wherein:
n is a positive integer;
i is an integer from 1 to n;
Y is a proteinaceous material, OH or $NH_2$; and
$R_a$ and each one of $R_i$ is independently selected from the group consisting of —$(CH_2)_3$—NH—$C(NH_2)(=NH)$ (arginine side group), —$(CH_2)_3$—NH—$C(OH)(=NH)$ (arginine side group where —$NH_2$ is replaced by —OH), —$(CH_2)_4NH_2$ (lysine side group), —$(CH_2)_4OH$ (lysine side group where —$NH_2$ is replaced by —OH), —$CH_2OH$ (serine side group), —$CHOHCH_3$ (threonine side group), —$CH_2$—$C_6H_4$p-OH (tyrosine side group), —$CH_2CONH_2$ (aspargine side group), —$CH_2COOH$ (aspartic acid side group), —$(CH_2)_2CONH_2$ (glutamine side group), —$(CH_2)_2COOH$ (glutamic acid side group), —$CH_2SH$ (cysteine side group), —H (glycine side group), —$CH_3$ (alanine side group), —$CH_2c(C=CH—N=CH—NH—)$ (histidine side group), —$CH(CH_3)CH_2CH_3$ (isoleucine side group), —$CH_2CH(CH_3)_2$ (leucine side group), —$(CH_2)_2SCH_3$ (methionine side group, —$CH_2C_6H_5$ (phenylalanine side group, —$CH_2$-c(C=CH—NH-Ph)-(tryptophan side group), and —$CH(CH_3)_2$ (valine side group);

where at least either Y is OH and/or at least one Ri or Ra is selected from the group consisting of —$(CH_2)_3$—NH—C (OH)(=NH) (arginine side group where —NH$_2$ is replaced by —OH) and —(CH$_2$)$_4$OH (lysine side group where —NH$_2$ is replaced by —OH).

Protein-Containing Substrate

The protein-containing substrate needed for the present invention is any protein-containing material. Suitable substrates include protein-containing solutions for vegetable origin such as tobacco leaves, pulses, and grains. Suitable substrates include protein-containing solutions of animal origin such as dairy products, eggs, meat products, inedible meat, abattoir waste and fishery waste. Suitable substrates also include protein-containing solutions of microbial origin.

Pretreatment

The present invention can be applied to any proteinaceous substance, even in a native state. As is clear to one skilled in the art, the average size and distribution of sizes of the components of the proteinaceous substance in the protein-containing substrate are amongst the factors that define the physical properties of the plastic of the present invention. For example, smaller-sized components of a proteinaceous substance yield a greater proportion of hydrophobic ester bonds at the expense of amide bonds in the final product, giving a plastic with greater moisture resistance. It is thus often advantageous to hydrolyze the components of the proteinaceous substance in the protein-containing substrate so as to modify the physical properties of the plastic ultimately obtained.

Additionally, many inexpensive protein sources (e.g. glutens) comprise a large proportion of insoluble or slightly insoluble proteins that are consequently difficult to separate from the carbohydrate component of such sources. Hydrolysis of proteins is a simple and cheap way to separate proteins from carbohydrates.

Hydrolysis of proteins is well known to one skilled in the art. All known methods of hydrolysis, including enzymatic and chemical methods, are suitable for use with the present invention. In general, enzymatic methods using selective proteases are preferred so that the size and distribution of the components of the proteinaceous substance can be controlled. Suitable proteases include, but are not limited to, bacterial alkaline proteases such as subtilisin and fungal mucor protease Conversion of Proteins to Protomers The first step of the method of the present invention is the preparation of protomers by reacting the components of the proteinaceous substance in the protein-containing substrate with either nitrous acid or nitrous oxide, preferably but not necessarily in an aqueous solution. The reaction of amino acids, peptides and proteins with nitrous acid or nitrous oxide is well known to one skilled in the art in the field of analytical chemistry (see for example, Walden, P. *Ber.*, 1985, 28, 2767-2773; Van Slyke, D. D. *J. Biol. Chem.*, 1911, 9, 185; Grousenard, J. P. *Bull. Soc. Chim. Fr.*, 1989, 1, 88-94; Schmidt, C. L. A. *J. Biol. Chem.*, 1929, 82, 587-594).

Generally, preparation of the hydroxyl-carboxyl protomers comprises (i) providing a protein-containing substrate; and either or both (ii) replacing primary amines of proteinaceous components of the protein-containing substrate with hydroxyl groups; and/or (iii) replacing amide groups of proteinaceous components of the protein-containing substrate with carboxyl groups; so as to make the protomers from the proteinaceous components.

The reaction of protein-containing substrate with nitrous acid or nitrous oxide can be performed at any temperature. It has been reported by Van Slyke and Schmidt that nitrous acid and nitrous oxide can react with peptide bonds at elevated temperatures. Thus according to the present invention, it is preferred that the reaction be performed at a temperature of less than about 55° C., more preferably less than about 45° C., even more preferably less than about 30° C., and most preferably at a temperature of less than about 20° C. Further, according to the present invention, it is preferred that the reaction be performed at a temperature of greater than about 0° C. and even more preferably greater than about 5° C.

The reaction of protein-containing substrate with nitrous acid or nitrous oxide is preferably performed at a pH of less than about 7, more preferably of less than about 6, and even more preferably at a pH of less than about 5. Further, the reaction of protein-containing substrate with nitrous acid or nitrous oxide is preferably performed at a pH of greater than about 1, more preferably of greater than about 2, and even more preferably at a pH of greater than about 3.

Adjustment of the pH of the protein-containing substrate is done in the usual way by the addition of an acid or a base, as required. When pH adjustment is necessary, it is preferable that the acid or base added is a one that results in an easily removable (that is soluble) salt such as HCl that can later be washed out as NaCl. More preferably, such an acid or base is an amine, a carboxylic acid or a conjugate base thereof. Such an acid or base needs not be removed in further processing and rather remains as a copolymer. In order to avoid capping of polymerization sites and consequent chain termination even more preferably, such an acid or base is a multifunctional molecule, especially a multifunctional carboxylic acid. By multifunctional carboxylic acid is meant a molecule having a carboxyl functional group and at least one additional functional group (such as an amide group, cyclic amide group, an amine group, an hydroxyl group, a carboxyl group, an ester group, a cyclic ester group) able to participate in protomer condensation as a copolymer. Examples of preferred pH adjustment molecules include but are not limited to aconitic acid, lactic acid, malic acid, aminovaleric acid, aminocaproic acid, and glycolic acid. Also preferred are multifunctional bases including multifunctional amines, especially diamino molecules such as putrescine and cadaverine. By multifunctional amine is meant a molecule having an amine functional group and at least one additional functional group (such as an amide group, cyclic amide group, an amine group, an hydroxyl group, a carboxyl group, an ester group, a cyclic ester group) able to participate in protomer condensation as a copolymer.

Thus, the adjustment of the pH of the reaction solution is preferably performed using suitable acids or bases that can also act as copolymers, vide infra.

As stated above, the reaction of protein-containing substrate with nitrous acid or nitrous oxide is a preferred method of obtaining protomers of the present invention. In the reaction of components of the proteinaceous substance in the protein-containing substrate react with nitrous acid or nitrous oxide to convert primary amines to hydroxyl groups (and possible free amide groups to carboxyls) so as to form hydroxyl-carboxyl protomers (for amino acids) and hydroxyl-carboxyl polyamide protomers (for dipeptides, tripeptides, polypeptides and proteins).

Primary amines such as those found at N-terminii of proteins (excepting secondary amino N-terminii) or on lysine residues are converted to hydroxy groups and are available for condensation in subsequent steps.

Generally, one amine group of a given arginine residue side group is converted to hydroxy groups and is available for condensation in subsequent steps.

The side chains of serine, threonine and tyrosine residues are generally unaffected by the reagents and are thus available for condensation in subsequent steps.

Under the reaction conditions side-groups of cysteine residues are possibly oxidized and are thus potentially available for condensation in subsequent steps.

Under the reaction conditions free amide groups, such as found on aspargine and glutamine residues, are possibly converted to carboxyl groups (aspartic acid and glutamic acid residues, respectively). Aspartic acid and glutamic acid residues are available for condensation reactions in subsequent step. It is important to note that generally even unconverted aspargine and glutamine residues are available for condensation reactions with hydroxyls in subsequent steps to form ester bonds (with the loss of ammonia).

In general, the side chains of glycine, alanine, valine, leucine, isoleucine, phenylalanine, proline and methionine residues are inert both during the conversion reaction and during the condensation reaction.

Although the side groups of arginine, histidine and tryptophan residues as well as N-terminal proline residues potentially react to yield nitrosoamines, preliminary experiments have yielded no evidence that such nitrosoamines, if produced, remain in the protomers, resins or plastic made. Clearly if under some conditions nitrosoamines were to be produced, these could be eliminated, for example, by the use of bisulfite.

Recovery of Hydroxyl-Carboxyl Protomer

Recovery of the hydroxyl-carboxyl protomer of the present invention involves extracting the protomers from the aqueous reaction solution. It is preferred that extraction is performed in such a way that the protomers are pure, that is that the protomers be separated from salts, byproducts of the conversion reaction and also from impurities and the like found in the protein-containing substrate.

As is apparent to one skilled in the art, the hydroxyl-carboxyl protomers of the present invention as described hereinabove are acidic. As a result, the chemical and extractive properties are analogous to hydroxyl acids such as lactic acid and malic acid. Well-known prior-art methods for extraction of hydroxyl-acids are applied to purify the protomers of the present invention when prepared as described hereinabove. A review of some methods for extraction can be found in Kertest, A. S.; King, C. J. *Biotech. Bioeng.*, 1986, 28, 269-282.

Three methods for the purification of soluble hydroxyl-acids that are applicable to sufficiently soluble protomers are a) liquid-liquid extraction using tertiary amines (see for example, King, C. J. Chemtech. 285-291 (1992)), b) liquid-liquid extraction using organo-phosphate compounds (see for example Malmary, G. et al. J. Chem. Tech. Biotechnol. 75: 1179-1173 (2000)) and c) solid-phase extraction (using, e.g., amino polymer sorbents such as Dowex manufactured by Dow Chemicals (New Jersey., USA)). In all these cases, ultimately achieved is a relatively pure protomers in an aqueous solution. The protomers are subsequently removed from the aqueous solution by evaporation or spray drying.

In cases where the solubility of protomers is such that the above methods known in the art are not applicable it has been found that removal of water from reaction solution can produce adequate results. Removal of water, for example, by evaporation, sublimation, freeze-drying, spray drying, osmosis and filtration of the reaction mixture is an excellent method for extracting protomers from an aqueous reaction solution.

Condensation of Protomers to Obtain a Resin

Once isolated, the protomers of the present invention are condensed to obtain a polymer or resin of the present invention. In the condensation reaction, a hydroxyl group of a first protomer reacts with a carboxyl group of a second protomer so as to form an inter-protomer ester bond with the loss of water. The inter-protomer ester bonds yield a polyester resin, generally a polyester-polyamide resin, of the present invention.

Condensation of hydroxyl-carboxyl compounds to yield polyester polymers such as PLA (polylactide) and the related PGA (polyglycolide) is well known in the art. Although many methods for forming polyester polymers are known, a preferred method found suitable for protomers of the present invention is direct condensation.

Direct Condensation of Hydroxyl and Carboxylic Groups

In the art many methods for the direct condensation of carboxyl with hydroxyl groups are known. A simple and applicable method of direct polymerization is in a protomer melt, preferably in the presence of a catalyst to form an inter-protomer ester bond. Direct polymerization is generally performed at elevated temperatures but usually lower than about 180° C. and even lower than about 150° C.

Suitable catalysts are transesterification and esterification catalysts. One skilled in the art knows of many such catalysts. Further, it is expected that new and suitable transesterification and esterification catalysts will be developed in the future.

Although an exhaustive list of suitable catalysts cannot be given, such catalysts include but are not limited to titanium compounds especially Ti(IV), tin compounds especially Sn(IV), antimony compounds especially Sb(III), magnesium compounds especially Mg(II), lead compounds especially Pb(III), zinc compounds especially Zn(II), zirconium compounds especially Zr(IV) as well as zeolites such as NaX faujasite zeolites and ETS-10 zeolites Specific examples of suitable catalysts includes: tetraorganodistannoxanes, 1,1,3,3-tetrabutyldichlorodistannoxane, $Bu_2SnO$, bis-(2-ethylhexanoate)-tin, $TiO_2$, $Mg(OEt)_2$, $Sb_2O_3$, Tyzor® TPT (tetra-isopropyl titanate, CAS# 546-68-9), Tyzor® AA (titanium acetylacetonate (bis(pentane-2,4-dionato-O,O') bis(alkanolato) titanium) and Tyzor® NBZ (zirconium tetra-n-butanolate, CAS# 107-76-7).

Suitable catalysts can be obtained from, amongst others, Johnson Matthey Plc (London, United Kingdom) and E.I. du Pont de Nemours and Company (Wilmington, Del., USA)

An advantage of melt condensation of protomers of the present invention in the presence of a catalyst is that suitable transesterification or esterification catalysts are generally also transamidation or amidation catalysts. Thus, amine functional groups present in a protomer mix, e.g. copolymer amine groups (vide infra), also participate in the condensation reactions of the present invention, forming interprotomer amide bonds.

Copolymers

In addition to pure polymers, resins and plastics made exclusively with protomers of the present invention, according to a feature of the present invention are provided polymers, resins and plastics that include copolymers. Suitable copolymers form bonds with the protomers of the present invention through esterification, transesterification, amidation or transamidation reactions, generally in the presence of a suitable catalyst. Suitable catalysts and conditions are substantially the same as discussed hereinabove.

The process of producing such a polymer generally comprises making a precursor mix by combining hydroxyl-carboxyl protomers with at least one copolymer and subsequently condensing molecules in the precursor mix to form the desired polymer. One type of bond formed during condensation is as discussed above, a reaction of a hydroxyl group of a first protomer with a carboxyl group of a second protomer so as to form an inter-protomer ester bond. Another type of condensation reaction is bond-forming reaction of a first functional group of a first protomer with a second functional group of a copolymer molecule. Such a reaction can, for example, be condensation of an amine with a carboxyl to form an amide or condensation of an alcohol with a carboxyl to form an ester. Preferred is that the copolymer act as a bridge between two protomers. In such a case condensation is a bond-forming reaction of a first functional group (of a first protomer) with a second functional group (of a copolymer molecule) and a bond-forming reaction of a third functional group (of a second protomer) with a fourth functional group (of the same copolymer molecule). In both the condensation of the first with the second functional group and the condensation of the third with the fourth functional group such a reaction can, for example, be condensation of an amine with a carboxyl to form an amide or condensation of an alcohol with a carboxyl to form an ester.

Copolymers have at least one functional group with which to condense with protomers of the present invention. Suitable functional groups include but are not limited to carboxyls, hydroxyls, amides, cyclic amides, esters, and cyclic esters. Generally suitable copolymers include but are not limited to carboxylic acids, poly carboxylic acids, alcohols, alcohol acids, amino acids, polyalcohols, amides, cyclic amides, polyamides, esters, cyclic esters, polyesters and polyurethanes.

Suitable monofunctional copolymers include acetic acid, formic acid, methanol and ethanol.

In order to avoid capping of polymerization sites and consequent chain termination multifunctional copolymers are preferred over monofunctional copolymers. Such multifunctional copolymers include but are not limited to polyamines, polyamides, polyesters, polyurethanes, polycarboxylic acids, polyalcohols as well as mixed functional groups such as amino acids, amino alcohols, alcohol acids and the like.

Suitable copolymers include, but are not limited to $\epsilon$-caprolactame, lactic acid, aconitic acid, malic acid, glycolic acid, alkyl amino acids such as aminovaleric acid, aminocaproic acid, and alkyl diamino compounds such as putrescine and cadaverine.

Degree of Cross Linking

One of the greatest disadvantages of prior art biodegradable polymers such as PLA or PGA is that these are linear polyesters. In order to make high molecular weight polymers, it is important to maintain a substantially equal number of carboxyl and hydroxyl groups taking part in condensation. In such cases, even small amounts of impurities such as carboxylic acids, alcohols or other hydroxy-containing molecule terminate growing chains. The protein-derived polymers of the present invention do not suffer from this disadvantage. Each protomer has a plurality of functional groups through which polyester and polyamide bonds are formed. Impurities may cap a specific site, but there are generally enough sites that incidental termination of growth at one site does not significantly affect the final product. Further, the polymers of the present invention are cross-linked. The degree of cross-linking is a variable that is adjusted to control the rate of degradation of the final product and mechanical properties such as glass transition temperature. A simple calculation shows, for example, that in fully digested corn gluten or soy bean protein the maximal degree of cross linking can be expected to be about 10% based on the ratio of carboxylates (C-terminii, Asp and Glu residues) to hydroxylates (N-terminii, Arg+Lys+Ser+Thr residues).

Bonds Characteristic of a Polymer of the Present Invention

Subsequent to condensation of protomers of the present invention, whether as a single specific molecule or as a mixture of different protomer molecules, and whether including copolymers as described hereinabove or not, interprotomer ester bonds are formed, the ester bonds being characteristic of the teachings of the present invention.

The characteristic ester bond is an ester bond A-B where A is selected from the group of radicals consisting of:
(NHX)(COY)CH—(CH$_2$)$_3$—NH—C(=NH)O. (hydroxylized arginine residue);
(NHX)(COY)CH—(CH$_2$)$_4$O. (hydroxylized lysine residue);
(NHX)(COY)CH—CH$_2$O. (serine reside);
(NHX)(COY)CH—CHCH$_3$O. (threonine residue);
(NHX)(COY)CH—CH$_2$—C$_6$H$_4$p-O.tyrosine residue); and
Y—CO—CHR$_A$—O. (hydroxylized N-terminal amine of a proteinaceous material)

and B is selected from the group of radicals consisting of:
(NHW)(COZ)CH—CH$_2$—C(=O).(aspartic acid residue);
(NHW)(COZ)CH—(CH$_2$)$_2$—C(=O).(glutamic acid residue); and
or WNHCHR$_B$C(=O).(C-terminal acid)

wherein R$_A$ and R$_B$ are independently selected from the group consisting of —(CH$_2$)$_3$—NH—C(NH$_2$)(=NH) (arginine side group), —(CH$_2$)$_3$—NH—C(OH)(=NH) (arginine side group where —NH$_2$ is replaced by —OH), —(CH$_2$)$_4$NH$_2$ (lysine side group), —(CH$_2$)$_4$OH (lysine side group where —NH$_2$ is replaced by —OH), —CH$_2$OH (serine side group), —CHOHCH$_3$ (threonine side group), —CH$_2$—C$_6$H$_4$p-OH (tyrosine side group), —CH$_2$CONH$_2$ (aspargine side group), —CH$_2$COOH (aspartic acid side group), —(CH$_2$)$_2$CONH$_2$ (glutamine side group), —(CH$_2$)$_2$COOH (glutamic acid side group), —CH$_2$SH (cysteine side group), —H (glycine side group), —CH$_3$ (alanine side group), —CH$_2$c(C=CH—N=CH—NH—) (histidine side group), —CH(CH$_3$)CH$_2$CH$_3$ (isoleucine side group), —CH$_2$CH(CH$_3$)$_2$ (leucine side group), —(CH$_2$)$_2$SCH$_3$ (methionine side group, —CH$_2$C$_6$H$_5$ (phenylalanine side group, —CH$_2$-c(C=CH—NH-Ph-) (tryptophan side group), and —CH(CH$_3$)$_2$ (valine side group); and wherein W, X, Y and Z are independently selected from the group consisting of H or a proteinaceous material. It is important to note that for A the (NHX) and the (COY) groups are bound to a central sp3 carbon to which a hydrogen and a respective radical functional group are also bound. Similarly, It is important to note that for A the (NHW) and the (COZ) groups are bound to a central sp3 carbon to which also a hydrogen and a respective radical functional group are also bound.

Depending on the substrate, a polymer of the present invention comprises at least one such bond A-B, at least two such bonds A-B, at least three such bonds, at least four such bonds, at least five such bonds, or in fact any number of such bonds A-B.

Since there are six alcohol derived ester components (A) and three acid derived ester components (B) there are a total of 18 such bonds, where:

A is (NHX)(COY)CH—(CH$_2$)$_3$—NH—C(=NH)O. and B is (NHW)(COZ)CH—CH$_2$—C(=O).;
A is (NHX)(COY)CH—(CH$_2$)$_4$O. and B is (NHW)(COZ)CH—CH$_2$—C(=O).;
A is (NHX)(COY)CH—CH$_2$O. and B is (NHW)(COZ)CH—CH$_2$—C(=O).;
A is (NHX)(COY)CH—CHCH$_3$O. and B is (NHW)(COZ)CH—CH$_2$—C(=O).;
A is (NHX)(COY)CH—CH$_2$—C$_6$H$_4$p-O. and B is (NHW)(COZ)CH—CH$_2$—C(=O).;
A is Y—CO—CHR$_A$—O. and B is (NHW)(COZ)CH—CH$_2$—C(=O).;
A is (NHX)(COY)CH—(CH$_2$)$_3$—NH—C(=NH)O. and B is (NHW)(COZ)CH—(CH$_2$)$_2$—C(=O).;

A is (NHX)(COY)CH—(CH$_2$)$_4$O. and B is (NHW)(COZ)CH—(CH$_2$)$_2$—C(=O).;

A is (NHX)(COY)CH—CH$_2$O. and B is (NHW)(COZ)CH—(CH$_2$)$_2$—C(=O).;

A is (NHX)(COY)CH—CHCH$_3$O. and B is (NHW)(COZ)CH—(CH$_2$)$_2$—C(=O).;

A is (NHX)(COY)CH—CH$_2$—C$_6$H$_4$p-O. and B is (NHW)(COZ)CH—(CH$_2$)$_2$—C(=O).;

A is Y—CO—CHR$_A$—O.radical and B is (NHW)(COZ)CH—(CH$_2$)$_2$—C(=O).;

A is (NHX)(COY)CH—(CH$_2$)$_3$—NH—C(=NH)O. and B is WNHCHR$_B$C(=O).;

A is (NHX)(COY)CH—(CH$_2$)$_4$O.; and B is WNHCHR$_B$C(=O).;

A is (NHX)(COY)CH—CH$_2$O. and B is WNHCHR$_B$C(=O).;

A is (NHX)(COY)CH—CHCH$_3$O. and B is WNHCHR$_B$C(=O).;

A is (NHX)(COY)CH—CH$_2$—C$_6$H$_4$p-O.radical and B is WNHCHR$_B$C(=O).;

A is Y—CO—CHR$_A$—O. and B is WNHCHR$_B$C(=O).

The polymers of the present invention can also be structurally characterized about a characteristic bond.

A polymer of substantially being two protomers bound through a carboxyl C-terminus of a first protomer and a hydroxyl N-terminus of a second protomer.

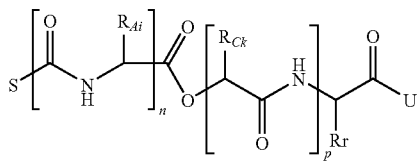

A polymer of substantially being two protomers bound through a glutamic residue side chain of a first protomer and a hydroxyl N-terminus of a second protomer.

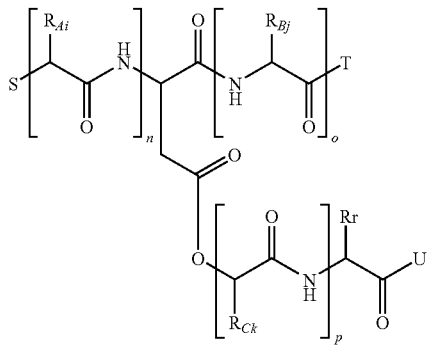

A polymer of substantially being two protomers bound through an aspartic residue side chain of a first protomer and a hydroxyl N-terminus of a second protomer.

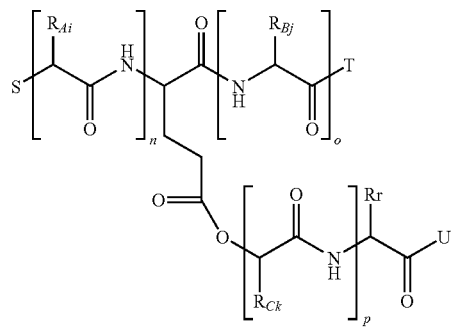

A polymer of substantially being two protomers bound through a carboxyl C-terminus of a first protomer and a tyrosine residue side chain of a second protomer.

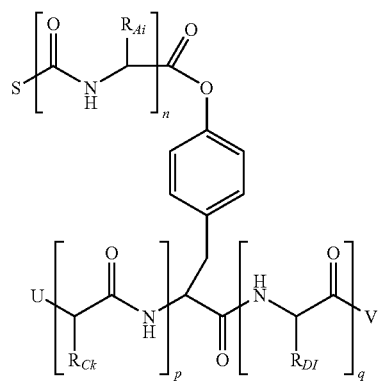

A polymer of substantially being two protomers bound through a glutamic residue side chain of a first protomer and a tyrosine residue side chain of a second protomer.

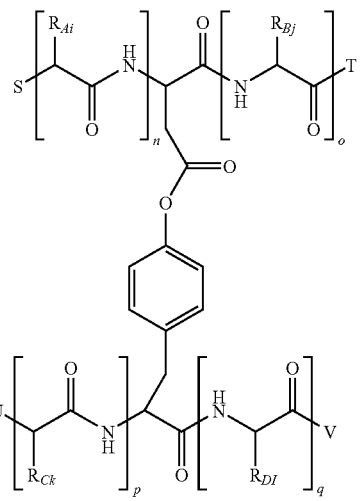

A polymer of substantially being two protomers bound through an aspartic residue side chain of a first protomer and a tyrosine residue side chain of a second protomer.

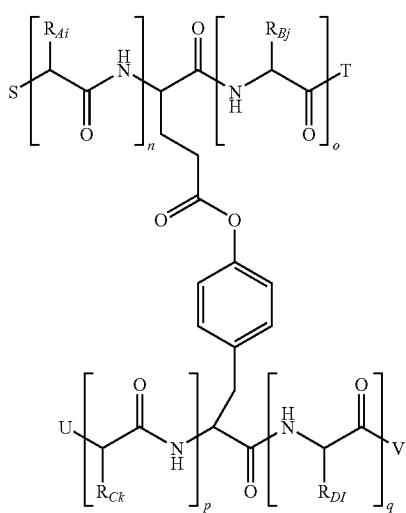

A polymer of substantially being two protomers bound through a carboxyl C-terminus of a first protomer and a tyrosine residue side chain of a second protomer.

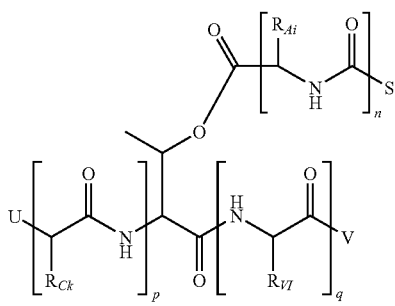

A polymer of substantially being two protomers bound through a carboxyl C-terminus of a first protomer and a threonine residue side chain of a second protomer.

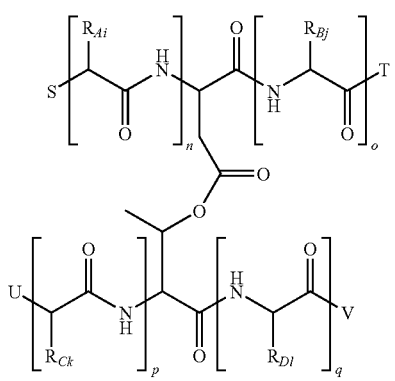

A polymer of substantially being two protomers bound through a glutamic residue side chain of a first protomer and a threonine residue side chain of a second protomer.

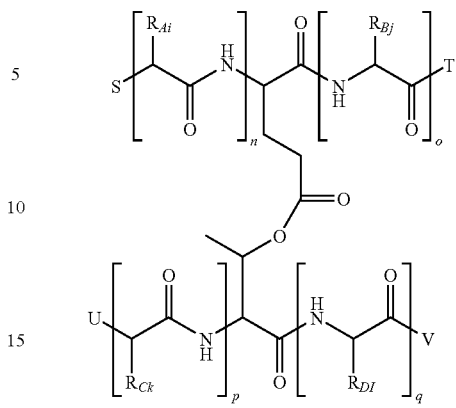

A polymer of substantially being two protomers bound through a carboxyl C-terminus of a first protomer and a serine residue side chain of a second protomer.

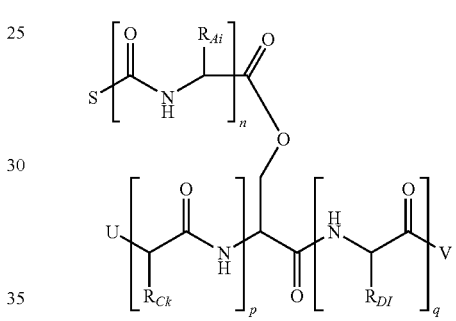

A polymer of substantially being two protomers bound through a glutamic residue side chain of a first protomer and a serine residue side chain of a second protomer.

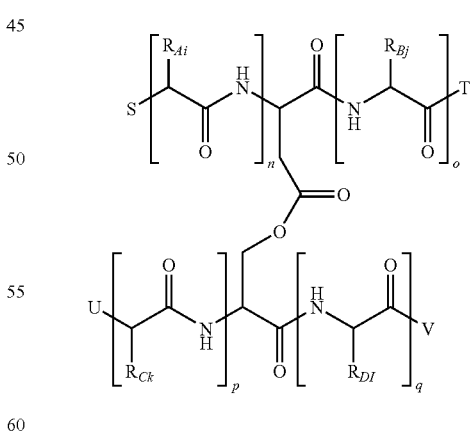

A polymer of substantially being two protomers bound through an aspartic residue side chain of a first protomer and a threonine residue side chain of a second protomer.

A polymer of substantially being two protomers bound through an aspartic residue side chain of a first protomer and a serine residue side chain of a second protomer.

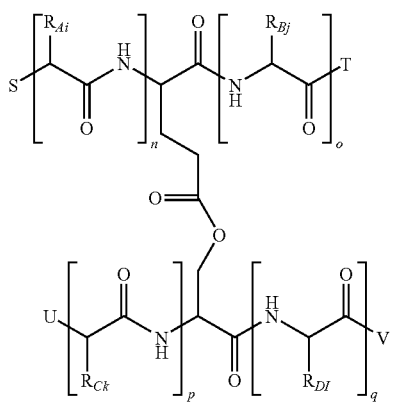

A polymer of substantially being two protomers bound through a carboxyl C-terminus of a first protomer and a lysine residue side chain where the amino group has been converted to a hydroxyl group of a second protomer.

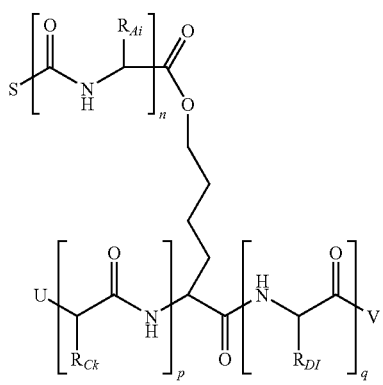

A polymer of substantially being two protomers bound through a glutamic residue side chain of a first protomer and a lysine residue side chain where the amino group has been converted to a hydroxyl group of a second protomer.

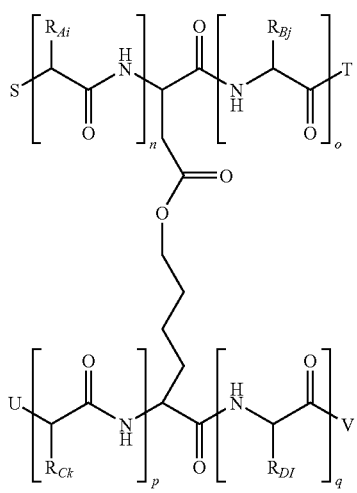

A polymer of substantially being two protomers bound through an aspartic residue side chain of a first protomer and a lysine residue side chain where the amino group has been converted to a hydroxyl group of a second protomer.

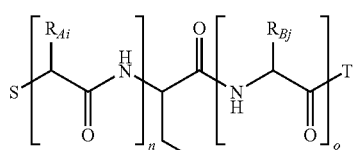

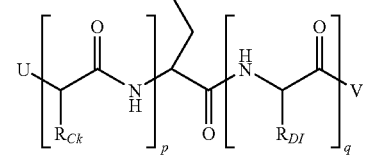

A polymer of substantially being two protomers bound through a carboxyl C-terminus of a first protomer and an arginine residue side chain where an amino group has been converted to a hydroxyl group of a second protomer.

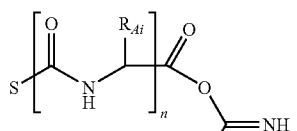

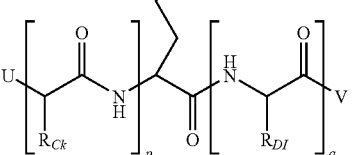

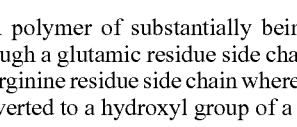

A polymer of substantially being two protomers bound through a glutamic residue side chain of a first protomer and an arginine residue side chain where an amino group has been converted to a hydroxyl group of a second protomer.

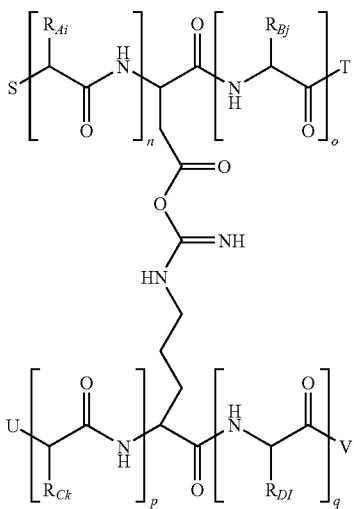

A polymer of substantially being two protomers bound through an aspartic residue side chain of a first protomer and an arginine residue side chain where an amino group has been converted to a hydroxyl group of a second protomer.

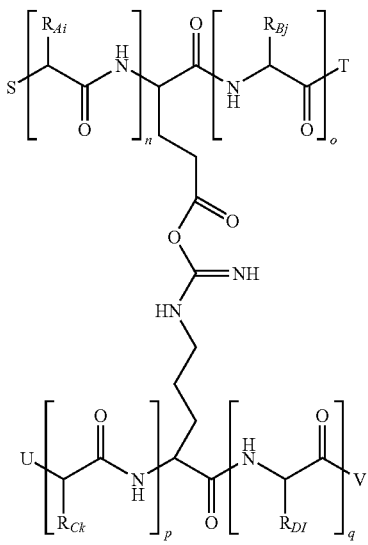

For all of the preceding 18 structures n, o, p and q are 0 or a positive integer, indicating the length of the respective peptide or protein segment. The respective indices i, j, k and l, if existing, are used to indicate a specific amino acid residue side chain. Each $R_I$, $R_{Ai}$, $R_{Bj}$, $R_{Ck}$ and $R_{Dl}$ is independently selected from the group consisting of —$(CH_2)_3$—NH—C$(NH_2)$(=NH), —$(CH_2)_3$—NH—C(OH)(=NH), —$(CH_2)_4$NH$_2$, —$(CH_2)_4$OH, —$CH_2$OH, —CHOHCH$_3$, —$CH_2$—C$_6$H$_4$p-OH, —$CH_2$CONH$_2$, —$CH_2$COOH, —$(CH_2)_2$CONH$_2$, —$(CH_2)_2$COOH, —$CH_2$SH, —H, —CH$_3$, —$CH_2$c(C=CH—N=CH—NH—), —CH(CH$_3$)CH$_2$CH$_3$, —CH$_2$CH(CH$_3$)$_2$, —$(CH_2)_2$SCH$_3$, —CH$_2$C$_6$H$_5$, —CH$_2$-c(C=CH—NH-Ph-), and —CH(CH$_3$)$_2$ and S, T, U and V are independently selected from the group consisting of OH, H, NH$_2$ or a proteinaceous material.

Depending on the substrate used, any of the above polymers are made according to the method of the present invention. A polymer can include at least one bond as described above, at least two, at least three bonds or even more bonds as described above.

The length of each protomer residue connected by a given bond is designated by the subscripts n, o, p and q and can be at least 1, at least 2, at least 3 or in fact any number and is dependent on the nature of the substrate.

It is important to note that for a polymer condensed from a precursor mixture having a large proportion of multifunctional copolymers, the importance of the above-depicted bonds is reduced. That said, a polymer obtained using the teachings of the present invention but not having a bond as depicted above is still considered to be within the scope of the present invention.

Products of the Present Invention

The polymers of the present invention, as described hereinabove are subsequently worked or fashioned into resins, plastics or plastic products. One skilled in the art is able use the teachings of the present invention to obtain resins, plastics and plastic products of the present invention.

Post-Polymerization Modifications

As with prior art polymers, properties of polymer of the present invention can be modified after polymerization. Properties that can be modified include the morphology, mechanical behavior and rate of degradation.

Additives

One method of modifying the biodegradation process of a polymer of the present invention is by the use of additives. Additives include inorganic compounds such as calcium phosphate, sodium bicarbonate, calcium di-hydrogen phosphate, calcium hydrogen phosphate, calcium phosphate and calcium carbonate and calcium carbonate. It has been shown in Ara, M.; Watanbe, M.; Imai, Y. *Biomaterial* 2002, 23, 2479-2483 that the addition of these compounds at amounts of up to 30% by weight of polymer (in a dioxane solution, followed by casting and freezing) has a degradation retarding effect. Such an effect is also expected for polymers made in accordance to the teachings of the present invention.

In order to modify physical properties of the present invention, it is often useful to introduce plasticizer. The use of plasticizer for modifying the physical properties of a resin or plastic is known to one skilled in the art.

Biodegradability

The polymers of the present invention are polyester or polyester polyamide polymers. Both polyester and polyamide bonds are biodegradable. The degradation products are natural α-amino and α-hydroxy carboxylic acids.

It is important to note that dense prior art plastics such as polyesters are only slowly biodegradable as the polymer surface is hydrophobic, preventing contact of degrading microflora. The use of protomer of the present invention, especially together with prior art polyester monomers as copolymers, allows the production of polyester-like plastics and resins that are significantly greater biodegradability both due to the increased hydrophilicity of the protomers as well as the fact that the polyester crystal structure is disturbed.

The increased biodegradability caused by disturbed crystal structures is not only expected for protomer/polyester monomer mixes but also for protomer/polyamide monomer and even protomer/polylactide monomer mixes.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

SPECIFIC SYNTHETIC EXAMPLES

Reference is now made to the following examples, which together with the above descriptions, illustrate the invention in a non limiting fashion.

EXPERIMENTAL RESULTS

Example 1

Deamination of the Protein Digest so as to obtain a Protomer A 69 g Bacto Tryptone (pancreatic digest of casein, Becton, Dickinson & Co.) was dissolved in 400 ml of 0.2 M aqueous solution of glycolic acid (99% Aldrich Chem. Co., St. Louis Mo., USA, Cat No. 12,473-7) with 0.1 g polypropylene glycol as an anti-foaming agent Aldrich Chem. Co., St. Louis, Mo., USA, Cat No. 20,233-9). The pH was 4.57±1.

The solution was transferred to a 500 ml stoppered jar. While stirring at ambient temperature, a sodium nitrite solution (10.53 g in 40 ml of water) was added under the liquid surface at a rate of 5 ml/hr. The solution was left to react overnight. Between 3.0 and 3.1 liter nitrogen gas were produced. The pH at the end of the reaction was 5.3±0.1.

Resulting was an aqueous solution of protomers of the present invention.

Example 2

Preparation of the Free Acid Form of Protomer A

The solution resulting from Example I comprised protomer salts. To convert the protomer salts to free acids the solution resulting from Example 1 was mixed for 20 minutes at ambient temperature with 27 g Dowex ion-exchange resin (AG 50W-X8, 100-200 mesh) in $H^+$ form. The ion-exchange resin (with cations) was separated from the solution by filtration and washed with 400 ml water to remove protomers incidentally associate with the resin. This was repeated an additional two times where the resin was washed each time with the same 400 ml of water.

After three ion exchange steps the filtrate containing the protomers and the washing water were combined to yield 900 ml of free-acid protomer solution having a pH was 2.2-2.3.

Example 3

Polymerization of Protomer A to Obtain a Resin 8 g of L-lactic acid (as a copolymer) was dissolved in 32 ml water and added to the combined filtrate/washing solution of Example 2 and evaporated under vacuum (30 µm Hg) to dryness. 2.5 g of bis-(2-ethylhexanoate)-tin were added (as a catalyst). The combined catalyst/protomer/copolymer was triturated to ensure even distribution of the components. The combined solids were maintained at 135° C. overnight under nitrogen. The resulting material was hard slightly brittle resin that was insoluble in water having a melting point of 150° C. The material was a thermoset plastic.

Example 4

Polymerization of Protomer A with L-Lactic Acid to Obtain a Resin

The steps of Examples 1 to 3 were repeated with 20, 40, 80 and 120 g of L-lactic acid (as a copolymer). All the resulting resins were thermoset plastics with an appearance and properties, including $T_g$, of poly-lactic acid with melting points between about 130° C. and about 150° C.

The steps of Examples 3 and 4 were repeated with the known organic titanate and zirconate esterification catalysts Tyzor® of type TPT (tetra-isopropyl titanate, CAS# 546-68-9), type AA (titanium acetylacetonate (bis(pentane-2,4-dionato-O,O') bis(alkanolato)titanium) and type NBZ (zirconium tetra-n-butanolate, CAS# 107-76-7) (all of E.I. du Pont de Nemours and Company, Wilmington, Del., USA). Resins, similar to those described above were obtained: the properties of polymers were not significantly influenced by the identity of the catalyst.

Example 5

Polymerization of Protomer A with ε-Caprolactam to Obtain a Resin

The steps of Examples 1 to 3 were repeated using 40, 80 and 120 g of ε-caprolactam instead of lactic acid (as a copolymer). Polymerization was carried out at 150° C. under a nitrogen flow. All the resulting resins were thermoset plastics with an appearance and properties, including $T_g$, of soft Nylon-6 with melting points between about 130° C. and about 150° C. All resins could be drawn into strands and blown into, films.

Example 6

Polymerization of Protomer A with ε-Caprolactam and 6-Aminocaproic Acid to Obtain a Resin The steps of Examples 1 to 3 were repeated using 40, 80 and 120 g of ε-caprolactam together with 5 g of 6-aminocaproic acid (both as copolymers). Polymerization was carried at 150° C. out under the nitrogen flow. All the resulting resins were thermoset plastics with an appearance and properties, including $T_g$, of soft Nylon-6 with melting points between about 130° C. and about 150° C.

Generally, the nomenclature used herein and the laboratory procedures utilized in the present invention include synthetic and analytical techniques. Such techniques are thoroughly explained in the literature.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, the present invention is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A process of producing a polymer comprising:
   (a) providing hydroxyl-carboxyl protomers; and
   (b) condensing said hydroxyl-carboxyl protomers to form at least one bond A-B, thereby producing the polymer,
wherein:
   A is selected from the group of radicals consisting of:
      (NHX)(COY)CH—(CH$_2$)$_3$—NH—C(=NH)O.
      (NHX)(COY)CH—(CH$_2$)$_4$O.
      (NHX)(COY)CH—CH$_2$O.
      (NHX)(COY)CH—CHCH$_3$O.
      and (NHX)(COY)CH—CH$_2$—C$_6$H$_4$p-O.,
   and
   B is selected from the group of radicals consisting of
      (NHW)(COZ)CH—CH$_2$—C(=O).
      (NHW)(COZ)CH—(CH$_2$)$_2$—C(=O).
      and WNHCHR$_B$C(=O).
   wherein R$_B$ is selected from the group consisting of:
      —(CH$_2$)$_3$—NH—C(NH$_2$)(=NH), —(CH$_2$)$_3$—NH—C(OH)(=NH), —(CH$_2$)$_4$NH$_2$, —(CH$_2$)$_4$OH,
      —CH$_2$OH, —CHOHCH$_3$, —CH$_2$—C$_6$H$_4$ p-OH, —CH$_2$CONH$_2$, —CH$_2$COOH, —(CH$_2$)$_2$CONH$_2$,
      —(CH$_2$)$_2$COOH, —CH$_2$SH, —H, —CH$_3$, —CH$_2$c(C=CH—N=CH—NH—), —CH(CH$_3$)CH$_2$CH$_3$,
      —CH$_2$CH(CH$_3$)$_2$, —(CH$_2$)$_2$SCH$_3$, —CH$_2$C$_6$H$_5$, —CH$_2$-c(C=CH—NH-Ph-) and —CH(CH$_3$)$_2$,
   wherein Y and Z are independently selected from the group consisting of OH and a proteinaceous material; and
   wherein W and X, are independently selected from the group consisting of H and a proteinaceous material; and
   wherein bond A-B is an ester bond.

2. The process of claim 1, wherein at least one of said hydroxyl-carboxyl protomers has a structure of:

Y'—CHR$_a$COOH wherein:
   Y' is a proteinaceous material, OH or NH$_2$; and
   R$_a$ is selected from the group consisting of —(CH$_2$)$_3$—NH—C(NH$_2$)(=NH),
   —(CH$_2$)$_3$—NH—C(OH)(=NH), —(CH$_2$)$_4$NH$_2$,
   —(CH$_2$)$_4$OH, —CH$_2$OH, —CHOHCH$_3$, —CH$_2$—C$_6$H$_4$ p-OH, —CH$_2$CONH$_2$, —CH$_2$COOH, —(CH$_2$)$_2$CONH$_2$, —(CH$_2$)$_2$COOH, —CH$_2$SH, —H, —CH$_3$,
   —CH$_2$c(C=CH—N=CH—NH—), —CH(CH$_3$)CH$_2$CH$_3$, —CH$_2$CH(CH$_3$)$_2$, —(CH$_2$)$_2$SCH$_3$,
   —CH$_2$C$_6$H$_5$, —CH$_2$-c(C=CH—NH-Ph-), and —CH(CH$_3$)$_2$.

3. The process of claim 1, wherein at least one of said hydroxyl-carboxyl protomers has a structure Y'—CHRaCO—[NHRnCO]n-NHRcCO—OH wherein:
   n is 0 or a positive integer;
   Y' is a proteinaceous material, OH or NH$_2$; and
   R$_a$, R$_c$ and each one of R$_n$ is independently selected from the group consisting of
      —(CH$_2$)$_3$—NH—C(NH$_2$)(=NH), —(CH$_2$)$_3$—NH—C(OH)(=NH), —(CH$_2$)$_4$NH$_2$, —(CH$_2$)$_4$OH,
   —CH$_2$OH, —CHOHCH$_3$, —CH$_2$—C$_6$H$_4$ p-OH, —CH$_2$CONH$_2$, —CH$_2$COOH, —(CH$_2$)$_2$CONH$_2$,
   —(CH$_2$)$_2$COOH, —CH$_2$SH, —H, —CH$_3$, —CH$_2$c(C=CH—N=CH—NH—), —CH(CH$_3$)CH$_2$CH$_3$,
   —CH$_2$CH(CH$_3$)$_2$, —(CH$_2$)$_2$SCH$_3$, —CH$_2$C$_6$H$_5$, —CH$_2$-c(C=CH—NH-Ph-), and —CH(CH$_3$)$_2$.

4. The process of claim 1, wherein said providing said hydroxyl-carboxyl protomers comprises:
   (i) providing a protein-containing substrate; and either or both
   (ii) replacing primary amines of proteinaceous components of said protein-containing substrate with hydroxyl groups; and/or
   (iii) replacing amide groups of proteinaceous components of said protein-containing substrate with carboxyl groups;
   so as to make said protomers from said proteinaceous components.

5. The process of claim 4, wherein said providing said hydroxyl-carboxyl protomers comprises:
   (i) providing a protein-containing substrate; and
   (ii) replacing primary amines of proteinaceous components of said protein-containing substrate with hydroxyl groups;
   so as to make said protomers from said proteinaceous components.

6. The process of claim 4, wherein said providing said hydroxyl-carboxyl protomers comprises:
   (i) providing a protein-containing substrate; and
   (ii) replacing amide groups of proteinaceous components of said protein-containing substrate with carboxyl groups;
   so as to make said protomers from said proteinaceous components.

7. The process of claim 4, wherein prior to said replacing, proteinaceous compounds in said protein containing substrate are hydrolyzed.

8. The process of claim 4, wherein said replacing comprises reacting said proteinaceous compounds with nitrous acid or nitrous oxides.

9. The process of claim 1, wherein said reacting takes place in an aqueous reaction solution, the pH of said aqueous reaction solution is adjusted by the addition of at least one compound, said at least one compound being selected from the group consisting of amine, carboxylic acid and a conjugate base of a carboxylic acid.

10. A process of producing a polymer comprising:
   (a) providing hydroxyl-carboxyl protomers;
   (b) providing at least one copolymer;
   (c) combining said hydroxyl-carboxyl protomers with said at least one copolymer to make a precursor mix; and
   (d) condensing molecules in said precursor mix to form the polymer, said condensing comprising forming at least one bond A-B,
wherein:
   A is selected from the group of radicals consisting of:
      (NHX)(COY)CH—(CH$_2$)$_3$—NH—C(=NH)O.
      (NHX)(COY)CH—(CH$_2$)$_4$O.
      (NHX)(COY)CH—CH$_2$O.
      (NHX)(COY)CH—CHCH$_3$O.
      and (NHX)(COY)CH—CH$_2$—C$_6$H$_4$ p-O.,
   and
   B is selected from the group of radicals consisting of
      (NHW)(COZ)CH—CH$_2$—C(=O).
      (NHW)(COZ)CH—(CH$_2$)$_2$—C(=O).
      and WNHCHR$_B$C(=O).
   wherein R$_B$ is selected from the group consisting of:

—$(CH_2)_3$—NH—C($NH_2$)(=NH), —$(CH_2)_3$—NH—C(OH)(=NH), —$(CH_2)_4NH_2$, —$(CH_2)_4OH$, —$CH_2OH$, —$CHOHCH_3$, —$CH_2$—$C_6H_4$ p-OH, —$CH_2CONH_2$, —$CH_2COOH$, —$(CH_2)_2CONH_2$, —$(CH_2)_2COOH$, —$CH_2SH$, —H, —$CH_3$, —$CH_2$c(C=CH—N=CH—NH—), —CH($CH_3$)$CH_2CH_3$, —$CH_2CH(CH_3)_2$, —$(CH_2)_2SCH_3$, —$CH_2C_6H_5$, —$CH_2$-c(C=CH—NH-Ph-) and —CH($CH_3$)$_2$, wherein Y and Z are independently selected from the group consisting of OH and a proteinaceous material; and wherein W and X, are independently selected from the group consisting of H and a proteinaceous material; and wherein bond A-B is an ester bond.

11. The process of claim 10, wherein said condensing is reaction of a hydroxyl group of a first protomer with a carboxyl group of a second protomer so as to form an interprotomer ester bond.

12. The process of claim 10, wherein said condensing is bond-forming reaction of a first functional group of a first protomer with a second functional group of a copolymer molecule and a bond-forming reaction of a third functional group of a second protomer with a fourth functional group of said copolymer molecule.

13. The process of claim 10, wherein said copolymer is monofunctional, having only one functional group.

14. The process of claim 10, wherein said copolymer is monofunctional, having at least two functional groups.

15. The process of claim 10, wherein said condensing is performed at a temperature of lower than about 180° C.

16. The process of claim 10, wherein said condensing is performed at a temperature of lower than about 150° C.

17. The process of claim 10, wherein said condensing is performed in the presence of a catalyst.

18. A polymer made according to the process of claim 1.

19. A polymer comprising at least one bond A-B, wherein A is selected from the group of radicals consisting of:
(NHX)(COY)CH—$(CH_2)_3$—NH—C(=NH)O.
(NHX)(COY)CH—$(CH_2)_4$O.
(NHX)(COY)CH—$CH_2$O.
(NHX)(COY)CH—$CHCH_3$O.
and (NHX)(COY)CH—$CH_2$—$C_6H_4$ p-O.
and
B is selected from the group of radicals consisting of
(NHW)(COZ)CH—$CH_2$—C(=O).
(NHW)(COZ)CH—$(CH_2)_2$—C(=O).
and WNHCHR$_B$C(=O).

wherein R$_B$ is selected from the group consisting of:
—$(CH_2)_3$—NH—C($NH_2$)(=NH), —$(CH_2)_3$—NH—C(OH)(=NH), —$(CH_2)_4NH_2$, —$(CH_2)_4OH$, —$CH_2OH$, —$CHOHCH_3$, —$CH_2$—$C_6H_4$ p-OH, —$CH_2CONH_2$, —$CH_2COOH$, —$(CH_2)_2CONH_2$, —$(CH_2)_2COOH$, —$CH_2SH$, —H, —$CH_3$, —$CH_2$c(C=CH—N=CH—NH—), —CH($CH_3$)$CH_2CH_3$, —$CH_2CH(CH_3)_2$, —$(CH_2)_2SCH_3$, —$CH_2C_6H_5$, —$CH_2$-c(C=CH—NH-Ph-) and —CH($CH_3$)$_2$, wherein Y and Z are independently selected from the group consisting of OH and a proteinaceous material; and wherein W and X, are independently selected from the group consisting of H and a proteinaceous material; and wherein bond A-B is an ester bond.

20. The polymer of claim 19 comprising at least two bonds A-B.

21. The polymer of claim 19 comprising at least five bonds A-B.

22. The polymer of claim 19, wherein:
A is a (NHX)(COY)CH—$(CH_2)_3$—NH—C(=NH)O.radical; and
B is a (NHW)(COZ)CH—$CH_2$—C(=O).radical.

23. The polymer of claim 19, wherein:
A is a (NHX)(COY)CH—$(CH_2)_4$O.radical; and
B is a (NHW)(COZ)CH—$CH_2$—C(=O).radical.

24. The polymer of claim 19, wherein:
A is a (NHX)(COY)CH—$CH_2$O.radical; and
B is a (NHW)(COZ)CH—$CH_2$—C(=O).radical.

25. The polymer of claim 19, wherein:
A is a (NHX)(COY)CH—$CHCH_3$O.radical; and
B is a (NHW)(COZ)CH—$CH_2$—C(=O).radical.

26. The polymer of claim 19, wherein:
A is a (NHX)(COY)CH—$CH_2$—$C_6H_4$ p-O.radical; and
B is a (NHW)(COZ)CH—$CH_2$—C(=O).radical.

27. The polymer of claim 19, wherein:
A is a (NHX)(COY)CH—$(CH_2)_3$—NH—C(=NH)O.radical; and
B is a (NHW)(COZ)CH—$(CH_2)_2$—C(=O).radical.

28. The polymer of claim 19, wherein:
A is a (NHX)(COY)CH—$(CH_2)_4$O.radical; and
B is a (NHW)(COZ)CH—$(CH_2)_2$—C(=O).radical.

29. The polymer of claim 19, wherein:
A is a (NHX)(COY)CH—$CH_2$O.radical; and
B is a (NHW)(COZ)CH—$(CH_2)_2$—C(=O).radical.

* * * * *